US012458673B2

(12) United States Patent
Hatfull et al.

(10) Patent No.: US 12,458,673 B2
(45) Date of Patent: Nov. 4, 2025

(54) USE OF SPECIFIC PHAGES FOR THE TREATMENT OF NONTUBERCULOSIS MYCOBACTERIA (NTM) INFECTIONS

(71) Applicant: University of Pittsburgh—Of the Commonwealth System of Higher Education, Pittsburgh, PA (US)

(72) Inventors: Graham F. Hatfull, Pittsburgh, PA (US); Carlos Andres Guerrero, Pittsburgh, PA (US); Rebekah Marie Dedrick, Glenshaw, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 646 days.

(21) Appl. No.: 17/689,096

(22) Filed: Mar. 8, 2022

(65) Prior Publication Data
US 2022/0193160 A1    Jun. 23, 2022

Related U.S. Application Data

(63) Continuation of application No. PCT/US2020/059388, filed on Nov. 6, 2020.

(60) Provisional application No. 62/931,948, filed on Nov. 7, 2019.

(51) Int. Cl.
*A61K 35/76* (2015.01)
*A61P 31/04* (2006.01)
*C12Q 1/18* (2006.01)

(52) U.S. Cl.
CPC .............. *A61K 35/76* (2013.01); *A61P 31/04* (2018.01); *C12Q 1/18* (2013.01)

(58) Field of Classification Search
None
See application file for complete search history.

(56) References Cited

U.S. PATENT DOCUMENTS

| | | | |
|---|---|---|---|
| 4,678,750 | A | 7/1987 | Vandenbergh et al. |
| 6,335,012 | B1 | 1/2002 | Fischetti et al. |
| 6,699,701 | B1 | 3/2004 | Sulakvelidze et al. |
| 2005/0004030 | A1 | 1/2005 | Fischetti et al. |
| 2005/0118567 | A1 | 6/2005 | Merril et al. |

FOREIGN PATENT DOCUMENTS

WO    WO-2021092362 A1    5/2021

OTHER PUBLICATIONS

Dedrick et al., "Engineered bacteriophages for treatment of a patient with a disseminated drug-resistant *Mycobacterium abscessus*", Nature Medicine, vol. 25, pp. 730-733. (Year: 2019).*
Rybniker et al., "Host range of 14 mycobacteriophages in *Mycobacterium ulcerans* and seven other mycobacteria including *Mycobacterium tuberculosis*—application for identification and susceptibility testing", Journal of Medical Microbiology, vol. 55, pp. 37-42. (Year: 2006).*
Adler, F., et al., Lung transplantation for cystic fibrosis, Proc Am Thor Soc, 6(8): 619-633 (2009).
Andrew, E.C., et al., Pulmonary *Mycobacterium abscessus* complex in children with cystic fibrosis: A practical management guideline, J Paediatr Child Health, 55(5) 502-511 (2019).
Dedrick, R.M., et al., Mycobacteriophage ZoeJ: A broad host-range close relative of mycobacteriophage TM4, Tuberculosis (Edinb), 115: 14-23 (2019).
Dedrick. R.M., et al., Engineered bacteriophages for treatment of a patient with a disseminated drug-resistant *Mycobacterium abscessus*, Nat Med, 25(5): 730-733 (2019).
Floto, R.A., et al., The growing threat of nontuberculous mycobacteria in CF, J Cyst Fibros, 14(1): 1-2 (2015).
Floto, R.A., et al., US Cystic Fibrosis Foundation and European Cystic Fibrosis Society consensus recommendations for the management of non-tuberculous mycobacteria in individuals with cystic fibrosis: executive summary, Thorax, 71(1): 88-90 (2016).
Hatfull, G.F., et al., Complete genome sequences of 138 mycobacteriophages, J Virol, 86(4): 2382-2384 (2012).
Johansen, M.D., et al., Non-tuberculous mycobacteria and the rise of *Mycobacterium abscessus*, Nat Rev Microbiol, 18(7): 392-407 (2020).
Kerem, E., Cystic fibrosis: Priorities and progress for future therapies, Paediatr Respir Rev, 24: 14-16 (2017).
Kortright, K.E., et al., Phage Therapy: A Renewed Approach to Combat Antibiotic-Resistant Bacteria, Cell Host Microbe, 25(2): 219-232 (2019).
Lopeman, R.C., et al., *Mycobacterium abscessus*: Environmental Bacterium Turned Clinical Nightmare, Microorganisms, 7(3): 90, pp. 1-17 (2019).
Marinelli, L.J., et al., BRED: a simple and powerful tool for constructing mutant and recombinant bacteriophage genomes, PLos One, 3(12): e3957 (2008).
Martiniano, S.L., et al., Nontuberculous Mycobacterial Infections in Cystic Fibrosis, Thorac Surg Clin, 29(1): 95-108 (2019).
Nessar, R., et al., *Mycobacterium abscessus*: a new antibiotic nightmare, J Antimicrob Chemother, 67(4): 810-818 (2012).
PCT/US2020/059388 International Search Report and Written Opinion mailed Mar. 18, 2021.
Pope, W.H., et al., Whole genome comparison of a large collection of mycobacteriophages reveals a continuum of phage genetic diversity, Elife, 28: e06416 (2015).
Rakhuba, D.V., et al., Bacteriophage receptors, mechanisms of phage adsorption and penetration into host cell, Pol J Microbiol, 59(3): 45-55 (2010).

(Continued)

*Primary Examiner* — Michelle F. Paguio Frising
*Assistant Examiner* — Grant C Currens
(74) *Attorney, Agent, or Firm* — Goodwin Procter LLP

(57) ABSTRACT

Disclosed herein are compositions comprising bacteriophages and methods of using these compositions for treating NTM infections. The present disclosure also provides compositions for screening bacteriophages that are effective in treating NTM infections and methods of using the same.

1 Claim, 10 Drawing Sheets

(56) References Cited

OTHER PUBLICATIONS

Sabin, A.P., et al., Mycobacterium abscessus Complex Infections in Children: A Review, Curr Infect Dis Rep, 19(11): 46 (2017).
Schorey, J.S., et al., The mycobacterial glycopeptidolipids: structure, function, and their role in pathogenesis, GLycobiology, 18(11): 832-841 (2008).
Sinnott, J.T., et al., Mycobacterial infections in the transplant patient, Semin Respir Infect, 5(1): 65073 (1990).
Jacobs-Sera D, et al. "On the nature of mycobacteriophage diversity and host preference." Virology. Dec. 20, 2012;434(2):187-201.

* cited by examiner

USE OF SPECIFIC PHAGES FOR THE TREATMENT OF NONTUBERCULOSIS MYCOBACTERIA (NTM) INFECTIONS

CROSS-REFERENCE TO RELATED APPLICATIONS

This application is a continuation of International Application No. PCT/US2020/059388, with an international filing date of Nov. 6, 2020, which claims the benefit of and priority to U.S. Provisional Patent Application No. 62/931,948, filed Nov. 7, 2019, the disclosures of each of which are incorporated by reference herein in their entireties for all purposes.

GOVERNMENT INTERESTS

This invention was made with government support under Grant No. GM116884 awarded by the National Institutes of Health (NIH). The government has certain rights in the invention.

FIELD OF THE INVENTION

The invention relates generally to use of compositions comprising bacteriophages for treatment of Nontuberculous Mycobacteria (NTM) infections.

BACKGROUND

Infections with non-tuberculous mycobacteria (NTM) are fairly common especially among patients with cystic fibrosis. A hallmark of these infections is that they are often difficult to manage clinically (see Lopeman, R. C., et al., (2019) *Mycobacterium abscessus*: Environmental Bacterium Turned Clinical Nightmare. Microorganisms 7), being resistant to many of the commonly used antibiotics and unresponsive to treatment (see Nessar, R., et. al, (2012) *Mycobacterium abscessus*: a new antibiotic nightmare. J Antimicrob Chemother 67:810-818: Kerem, E., (2017) Cystic fibrosis: Priorities and progress for future therapies. Paediatr Respir Rev 24:14-16). As a result, there is a strong and urgent need for new tools and approaches for diagnosis and treatment of mycobacterial diseases. The present disclosure provides compositions of and therapeutic uses of bacteriophages for treatment of NTM infections.

SUMMARY OF THE INVENTION

In one aspect, the present disclosure provides a composition for treating a nontuberculous mycobacteria infection, the composition comprising bacteriophages BPsΔ33HTH-HRM10, Muddy, ZoeJΔ45; and one or more bacteriophages selected from Adephagia, Adjutor, Alma, BPs, BPsΔ33, BPsΔ33HTH_HRM10, BPs_HRM2, BPsΔ33HTH_HRM$^{GD03}$, BPsΔ33HTH_HRM$^{GD10}$, Bxb1, Cain, Charlie, Che9c, D29, Elmo_HRM$^{smeg}$, FionnbharthΔ45Δ47, Fred313_cpm1, Isca, Isca_HRM$^{smeg}$, Itos, Island3, Jeon, Larva, Muddy_HRM$^{GD04}$, Nanosmite, Peaches, Pegleg, ZoeJ, Faith1Δ38-40, and a variant of any one or more of the bacteriophages. In certain embodiments, the nontuberculous mycobacteria are selected from *Mycobacterium avium, Mycobacterium abscessus, Mycobacterium smegmatis, Mycobacterium avium* complex (MAC) (*Mycobacterium avium* and *Mycobacterium intracellulare*), *Mycobacterium bolletti, Mycobacterium chelonae, Mycobacterium ulcerans, Mycobacterium xenopi, Mycobacterium kansasii, Mycobacterium fortuitum* complex (*Mycobacterium fortuitum* and *Mycobacterium chelonae*), *Mycobacterium marinum*, and any combination(s) thereof.

In another aspect, the present disclosure provides a composition for treating a human subject infected with *Mycobacterium abscessus*, the composition comprising: bacteriophages Muddy, ZoeJΔ45, and BPsΔ33HTH-HRM10, and one or more bacteriophages selected from Adephagia, BPs, BPsΔ33HTH_HRM$^{GD03}$, BPsΔ33HTH_HRM$^{GD10}$, D29, Elmo_HRM$^{smeg}$, FionnbharthΔ45Δ47, Fred313_cpm1, Isca, Itos, Muddy_HRM$^{GD04}$, Faith1 Δ38-40, and a variant of any one or more of the bacteriophages.

In another aspect, the present disclosure provides a composition for treating a human subject infected with *Mycobacterium smegmatis*, the composition comprising: bacteriophages Muddy, ZoeJΔ45, BPsΔ33HTH-HRM10; and one or more bacteriophages selected from Adephagia, Adjutor, Alma, BPs, BPsΔ33, BPsΔ33HTH_HRM10, BPs_HRM2. Bxb1, Cain, Charlie, Che9c, Isca, Isca_HRMsmeg, Island3, Jeon, Larva, Nanosmite, Peaches, Pegleg, ZoeJ, and a variant of any one or more of the bacteriophages.

In another aspect, the present disclosure provides a method of treating a nontuberculous mycobacteria infection, comprising administering to the subject an effective amount of a composition comprising bacteriophages BPsΔ33HTH-HRM10, Muddy, ZoeJΔ45; and one or more bacteriophages selected from Adephagia, Adjutor, Alma, BPs, BPsΔ33, BPsΔ33HTH_HRM10, BPs_HRM2, BPsΔ33HTH_HRMGD03, BPsΔ33HTH_HRMGD10, Bxb1, Cain, Charlie, Che9c, D29, Elmo_HRMsmeg, FionnbharthΔ45Δ47, Fred313_cpm1, Isca, Isca_HRMsmeg, Itos, Island3, Jeon, Larva, Muddy_HRMGD04, Nanosmite, Peaches, Pegleg, ZoeJ, Faith1Δ38-40, and a variant of any one or more of the bacteriophages. In certain embodiments, the composition is administered in a concentration sufficient to reduce or eliminate nontuberculous mycobacteria. In certain embodiments, the nontuberculous mycobacteria are selected from *Mycobacterium avium. Mycobacterium abscessus, Mycobacterium smegmatis, Mycobacterium avium* complex (MAC) (*Mycobacterium avium* and *Mycobacterium intracellulare*), *Mycobacterium bolletti, Mycobacterium chelonae, Mycobacterium ulcerans, Mycobacterium xenopi, Mycobacterium kansasii, Mycobacterium fortuitum* complex (*Mycobacterium fortuitum* and *Mycobacterium chelonae*), *Mycobacterium marinum*, and any combination(s) thereof.

In another aspect, the present disclosure provides a method of treating a nontuberculous mycobacteria infection in a cystic fibrosis subject, the method comprising administering to the subject an effective amount of a composition comprising bacteriophages BPsΔ33HTH-HRM10, Muddy, ZoeJΔ45; and one or more bacteriophages selected from Adephagia, Adjutor, Alma, BPs, BPsΔ33, BPsΔ33HTH_HRM10, BPs_HRM2, BPsΔ33HTH_HRMGD03, BPsΔ33HTH_HRMGD10, Bxb1, Cain, Charlie, Che9c, D29, Elmo_HRMsmeg, FionnbharthΔ45Δ47, Fred313_cpm1, Isca, Isca_HRMsmeg, Itos, Island3, Jeon, Larva, Muddy_HRMGD04, Nanosmite, Peaches, Pegleg, ZoeJ, Faith1Δ38-40, and a variant of any one or more of the bacteriophages, wherein the subject is infected with a nontuberculous mycobacteria selected from *Mycobacterium avium, Mycobacterium abscessus, Mycobacterium smegmatis, Mycobacterium avium* complex (MAC) (*Mycobacterium avium* and *Mycobacterium intracellulare*), *Mycobacterium bolletti, Mycobacterium chelonae, Mycobacterium ulcerans, Mycobacterium xenopi, Mycobacterium kansasii, Mycobac-

*terium fortuitum* complex (*Mycobacterium fortuitum* and *Mycobacterium chelonae*), *Mycobacterium marinum*, and any combination(s) thereof.

In another aspect, the present disclosure provides a method of treating a human subject infected with *M. abscessus*, comprising administering to the subject an effective amount of a composition comprising bacteriophages Muddy, ZoeJΔ45, and BPsΔ33HTH-HRM10, and one or more bacteriophages selected from Adephagia, BPs, BPsΔ33HTH_HRMGD03, BPsΔ33HTH_HRMGD10, D29, Elmo_HRMsmeg, FionnbharthΔ45Δ47, Fred313_cpm1, Isca, Itos, Muddy_HRMGD04, Faith1Δ38-40, and a variant of any one or more of the bacteriophages.

In another aspect, the present disclosure provides a method of treating *M. abscessus* infection in a cystic fibrosis subject, the method comprising administering to the subject an effective amount of a composition comprising bacteriophages Muddy, ZoeJΔ45, and BPsΔ33HTH-HRM10, and one or more bacteriophages selected from Adephagia, BPs, BPsΔ33HTH_HRMGD03, BPsΔ33HTH_HRMGD10, D29, Elmo_HRMsmeg. FionnbharthΔ45Δ47, Fred313_cpm1, Isca, Itos, Muddy_HRMGD04, Faith1 Δ38-40, and a variant of any one or more of the bacteriophages.

In another aspect, the present disclosure provides a method of treating a human subject infected with *M. smegmatis*, comprising administering to the subject an effective amount of a composition comprising bacteriophages Muddy, ZoeJΔ45, and BPsΔ33HTH-HRM10, and one or more bacteriophages selected from Adephagia, Adjutor, Alma, BPs, BPsΔ33, BPsΔ33HTH_HRM10, BPs_HRM2, Bxb1, Cain, Charlie, Che9c, Isca, Isca_HRMsmeg, Island3, Jeon, Larva, Nanosmite, Peaches. Pegleg, ZoeJ, and a variant of any one or more of the bacteriophages.

In another aspect, the present disclosure provides a method of treating *M. smegmatis* infection in a cystic fibrosis subject, comprising administering to the subject an effective amount of a composition comprising bacteriophages Muddy, ZoeJΔ45, and BPsΔ33HTH-HRM10, and one or more bacteriophages selected from Adephagia, Adjutor, Alma, BPs, BPsΔ33, BPsΔ33HTH_HRM10, BPs_HRM2, Bxb1, Cain, Charlie, Che9c, Isca, Isca_HRMsmeg, Island3, Jeon, Larva, Nanosmite, Peaches, Pegleg, ZoeJ, and a variant of any one or more of the bacteriophages.

In another aspect, the present disclosure provides a method of treating a subject infected with a nontuberculous mycobacteria, wherein the subject is identified as infected with a nontuberculous mycobacterial strain which does not have a smooth colony morphology, wherein the method comprises administering to the subject an effective amount of a composition comprising bacteriophages BPsΔ33HTH-HRM10. Muddy, ZoeJΔ45; and one or more bacteriophages selected from Adephagia, Adjutor, Alma, BPs, BPsΔ33, BPsΔ33HTH_HRM10, BPs_HRM2, BPsΔ33HTH_HRMGD03, BPsΔ33HTH_HRMGD10. Bxb1, Cain, Charlie, Che9c, D29, Elmo_HRMsmeg, FionnbharthΔ45Δ47, Fred313_cpm1, Isca, Isca_HRMsmeg, Itos, Island3, Jeon, Larva, Muddy_HRMGD04, Nanosmite, Peaches, Pegleg, ZoeJ, Faith1 Δ38-40, and a variant of any one or more of the bacteriophages. In certain embodiments, the composition comprises bacteriophages Muddy, ZoeJΔ45, and BPsΔ33HTH-HRM10, and one or more bacteriophages selected from Adephagia. BPs. BPsΔ33HTH_HRMGD03, BPsΔ33HTH_HRMGD10. D29, Elmo_HRMsmeg. FionnbharthΔ45Δ47, Fred313_cpm1, Isca, Itos, Muddy_HRMGD04, Faith1 Δ38-40, and a variant of any one or more of the bacteriophages. In certain embodiments, the composition comprises bacteriophages Muddy, ZoeJΔ45, BPsΔ33HTH-HRM10); and one or more bacteriophages selected from Adephagia, Adjutor, Alma, BPs, BPsΔ33, BPsΔ33HTH_HRM10, BPs_HRM2, Bxb1, Cain, Charlie, Che9c, Isca, Isca_HRMsmeg, Island3, Jeon, Larva, Nanosmite, Peaches, Pegleg, ZoeJ, and a variant of any one or more of the bacteriophages.

In certain embodiments, the composition is administered in a concentration sufficient to reduce or eliminate nontuberculous mycobacteria. In certain embodiments, the nontuberculous mycobacteria are selected from *Mycobacterium avium, Mycobacterium abscessus, Mycobacterium smegmatis, Mycobacterium avium* complex (MAC) (*Mycobacterium avium* and *Mycobacterium intracellulare*), *Mycobacterium bolletti, Mycobacterium chelonae, Mycobacterium ulcerans, Mycobacterium xenopi, Mycobacterium kansasii, Mycobacterium fortuitum* complex (*Mycobacterium fortuitum* and *Mycobacterium chelonae*), *Mycobacterium marinum*, and any combination(s) thereof.

In certain embodiments, the not having smooth colony morphology is determined by a method comprising a.) obtaining a sample derived from a subject injected with a nontuberculous mycobacteria: b.) streaking the sample onto solid media: c.) incubating the media plate; and d.) visualizing the mycobacterial colony morphology. In certain embodiments, the mycobacterial colony morphology is visualized by optical microscopy. In certain embodiments, the sample is blood, sputum, phlegm, urine, or stool.

In certain embodiments, the nontuberculous mycobacterial strain which does not have a smooth colony morphology exhibits a reduced expression of glycopeptidolipids molecules relative to nontuberculous mycobacterial strain which has a smooth colony morphology. In certain embodiments, the expression of glycopeptidolipids molecules in nontuberculous mycobacterial strain which does not have a smooth colony morphology is between 1.2-fold to 5-fold less relative to nontuberculous mycobacterial strain which has a smooth colony morphology. In certain embodiments, the nontuberculous mycobacterial strain which does not have a smooth colony morphology exhibits susceptibility to one or more of bacteriophages selected from BPs33HTH_HRM, Muddy, ZoeJΔ45, Itos, Faith 1Δ38-40, FionnbharthΔ45Δ47, D29_HRMGD40, and Elmo.

In yet another aspect, the present disclosure provides a method of testing susceptibility of nontuberculous mycobacteria to one or more bacteriophages selected from BPsΔ33HTH_HRM, Muddy, ZoeJΔ45, Itos, Faith1Δ38-40, FionnbharthΔ45Δ47, D29_HRMGD40), and Elmo, wherein the method comprises a.) obtaining a sample derived from a subject: b.) culturing the nontuberculous mycobacterial strain in nutrient growth medium: c.) plating soft agar combined with an aliquot of the culture onto solid media: d.) spotting 10-fold serial dilutions of the phages on top of the overlayed plate: e.) incubating the media plate: f.) visualizing the plate; and g.) scoring for phage susceptibility. In certain embodiments, the phage susceptibility is determined by a plaque assay. In certain embodiments, the sample is derived from a human. In certain embodiments, the sample is blood, sputum, phlegm, urine, or stool. In certain embodiments, the nutrient growth medium is supplemented with a divalent metal. In certain embodiments, the divalent metal is selected from the group consisting of: Mg, Ca, Mn, Ni, Zn, Co, Sr, Cu, and Cr. In certain embodiments, the scoring for phage susceptibility is determined by colony morphology score. In certain embodiments, colony morphology score is determined by chemical staining and/or by microarray analysis. In certain embodiments, the colony morphology score is determined by expression of glycopeptidolipid molecules. In certain embodiments, the colony morphology is scored as rough if it exhibits a reduced expression of glycopeptidolipid molecules relative to a smooth colony morphology. In certain embodiments, the expression of glycopeptidolipid molecules in nontuberculous mycobacterium with rough colony morphology is between 1.2-fold to 5-fold less relative to nontuberculous mycobacterial strain with smooth colony morphology. In certain embodiments, if a colony is scored as a smooth morphology it does not exhibit susceptibility to one or more bacteriophages. In certain embodiments, if a colony morphology is not scored as rough it does not exhibit susceptibility to one or more bacteriophages. In certain embodiments, the nontuberculous mycobacteria is selected from the group comprising *Mycobacterium avium, Mycobacterium abscessus, Mycobacterium smegmatis, Mycobacterium avium* complex (MAC) (*Mycobacterium avium* and *Mycobacterium intracellulare*), *Mycobacterium bolletti, Mycobacterium chelonae, Mycobacterium ulcerans, Mycobacterium xenopi, Mycobacterium kansasii, Mycobacterium fortuitum* complex (*Mycobacterium fortuitum* and *Mycobacterium chelonae*), *Mycobacterium marinum*, and any combination(s) thereof.

In yet another aspect, the present disclosure provides a composition for screening one or more bacteriophages effective in treating one or more mycobacterial infections, the composition comprising one or more bacteriophages selected from BPsΔ33HTH-HRM10. Muddy, ZoeJΔ45, Adephagia, Adjutor, Alma, BPs, BPsΔ33, BPsΔ33HTH_HRM10). BPs HRM2, BPsΔ33HTH_HRMGD03, BPsΔ33HTH_HRMGD10, Bxb1, Cain, Charlie, Che9 c, D29, Elmo_HRMsmeg, FionnbharthΔ45Δ47, Fred313_cpm1, Isca, Isca_HRMsmeg, Itos, Island3, Jeon, Larva, Muddy_HRMGD04, Nanosmite, Peaches, Pegleg, ZoeJ. Faith1Δ38-40, and a variant of any one or more of the bacteriophages. In certain embodiments, the composition for screening one or more bacteriophages effective in treating one or more mycobacterial infection is capable of expressing a reporter molecule. In certain embodiments, the genomic DNA of a bacteriophage encodes a reporter molecule. In certain embodiments, the reporter molecule is a fluorescent protein. In certain embodiments, the genome DNA of a bacteriophage further encodes a transcriptional promoter.

In some embodiments, the present disclosure provides a method of screening for bacteriophages effective in treating mycobacterial infections comprising incubating the composition for screening one or more bacteriophages effective in treating one or more mycobacteria infections in the presence of a mycobacterium; and assessing infectivity of mycobacterium by the bacteriophage.

These and other aspects and features of the invention are described in the following detailed description and claims.

BRIEF DESCRIPTION OF THE DRAWINGS

The invention can be more completely understood with reference to the following drawings.

DETAILED DESCRIPTION

Figure 1:
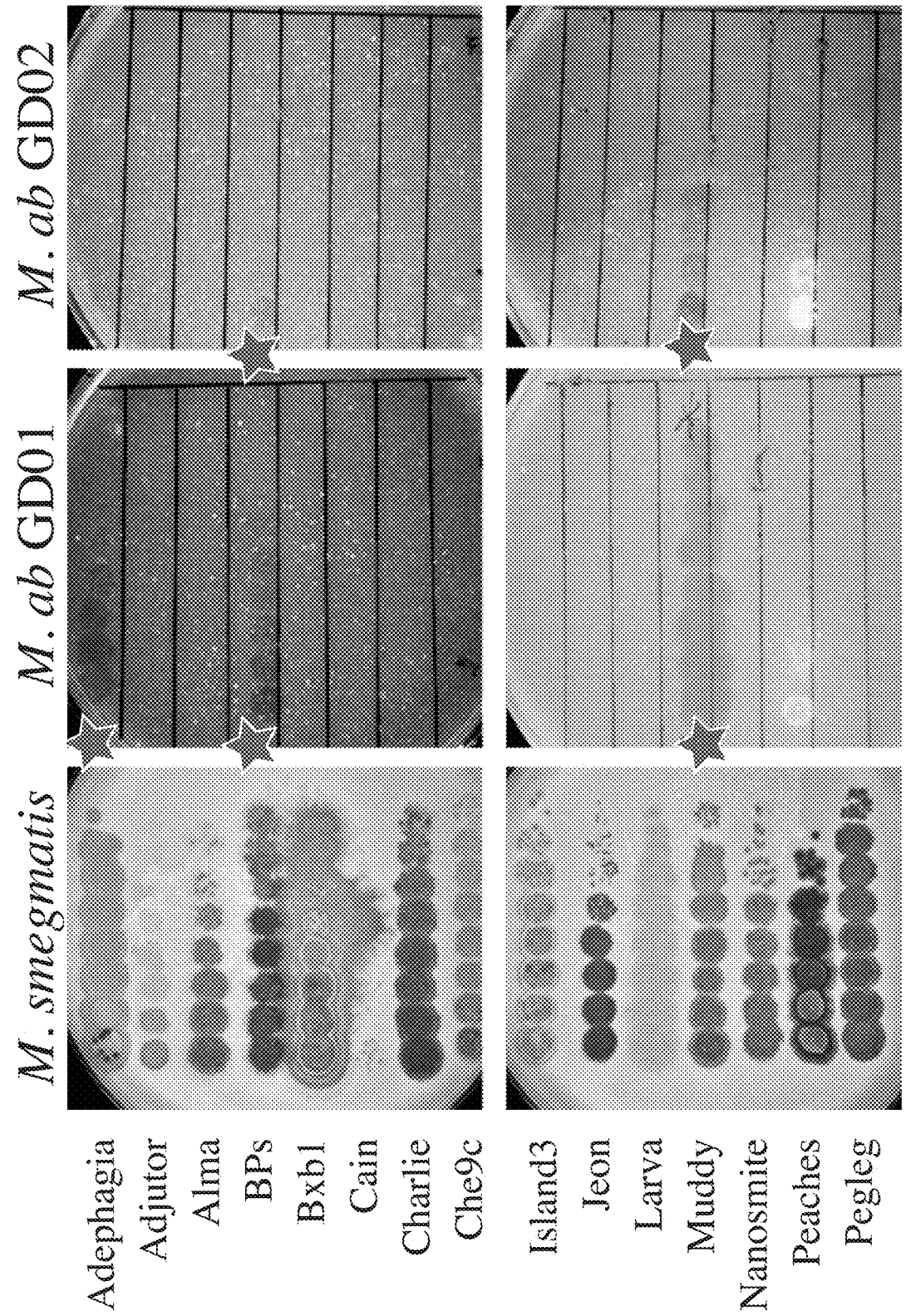
FIG. 1 shows agar plates illustrating phage susceptibilities of *M. smegmatis, M. abscessus* GD01 (M ab GD01), and *M. abscessus* GD02 (M ab GD02) using standard plaque assays. Each plaque indicates an initial infection with one phage. Bacteriophages that infected one or more *M. abscessus* strains are indicated by a star.

The invention is directed to, in part, one or more compositions useful for treatment of highly antibiotic resistant infections such as nontuberculous mycobacteria infection. The invention is also directed to mycobacterial species-specific reporter mycobacterial phages and the use of such reporter mycobacterial phages for screening bacteriophages that are effective in treating highly antibiotic resistant infections such as nontuberculous mycobacteria infection. The invention is also directed to screening whether a subject infected with highly antibiotic resistant bacterial strain will benefit from one or more compositions disclosed herein.

As used herein, "subject" refers to an animal. In certain embodiments, the subject is a human.

The terms "treat," "treating," or "treatment," and other grammatical equivalents as used in this disclosure, include alleviating, abating, ameliorating, or preventing a disease, condition or symptoms, preventing additional symptoms, ameliorating or preventing the underlying metabolic causes of symptoms, inhibiting the disease or condition, e.g., arresting the development of the disease or condition, relieving the disease or condition, causing regression of the disease or condition, relieving a condition caused by the disease or condition, or stopping the symptoms of the disease or condition, and are intended to include prophylaxis. The terms further include achieving a therapeutic benefit and/or a prophylactic benefit. By therapeutic benefit is meant eradication or amelioration of the underlying disorder being treated. Also, a therapeutic benefit is achieved with the eradication or amelioration of one or more of the physiological symptoms associated with the underlying disorder such that an improvement is observed in the subject, notwithstanding that the subject may still be afflicted with the underlying disorder.

The therapeutic response can be any response that a user (e.g., a clinician) will recognize as an effective response to the therapy. The therapeutic response will generally be a reduction, inhibition, delay or prevention in growth of or reproduction of one or more bacterium, or the killing of one or more bacterium. A therapeutic response may also be reflected in an improvement in pulmonary function, for example forced expiratory volume in one second (FEV1). It is further within the skill of one of ordinary skill in the art to determine appropriate treatment duration, appropriate doses, and any potential combination treatments, based upon an evaluation of therapeutic response.

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, .gamma.-carboxyglutamate, and O-phosphoserine. Amino acid analog refers to a compound that has the same basic chemical structure as a naturally occurring amino acid, e.g., an a carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain a basic chemical structure as a naturally occurring amino acid. Amino acid mimetic refers to a chemical compound that has a structure that is different from the general chemical structure of an amino acid, but that functions in a manner similar to a naturally occurring amino acid.

"Protein", "polypeptide", or "peptide" refers to a polymer in which a substantial fraction or all of the monomers are amino acids and are joined together through amide bonds, alternatively referred to as a polypeptide. When the amino acids are α-amino acids, either the L-optical isomer or the D-optical isomer can be used. Additionally, unnatural amino acids, e.g., β-alanine, phenylglycine, and homoarginine, are also included. Amino acids that are not gene-encoded may also be used in the presently disclosed compositions and methods. Furthermore, amino acids that have been modified to include appropriate structure or reactive groups may also be used. The amino acids can be D- or L-isomer, or mixtures thereof. L-isomers are generally preferred. Other peptidomimetics can also be used. For a general review, see, Spatola, in Weinstein, et al. (eds. 1983) Chemistry and Biochemistry of Amino Acids, Peptides and Proteins Marcel Dekker, New York, p. 267.

The term "recombinant" when used with reference to a cell indicates that the cell replicates a heterologous nucleic acid, or expresses a peptide or protein encoded by a heterologous nucleic acid. Recombinant cells can contain genes that are not found within the native (non-recombinant) form of the cell. Recombinant cells can also contain genes found in the native form of the cell wherein the genes are modified and re-introduced into the cell by artificial means. The term also encompasses cells that contain a nucleic acid endogenous to the cell that has been modified without removing the nucleic acid from the cell; such modifications include those obtained by gene replacement, site-specific mutation, and related techniques. In particular, fusions of sequence may be generated, e.g., incorporating an upstream secretion cassette upstream of desired sequence to generate secreted protein product.

A "fusion protein" refers to a protein comprising amino acid sequences that are in addition to, in place of, less than, and/or different from the amino acid sequences encoding the original or native full-length protein or subsequences thereof. More than one additional domain can be added to a cell wall lytic protein as described herein, e.g., an epitope tag or purification tag, or multiple epitope tags or purification tags, or a fluorescent tag. Additional domains may be attached, e.g., which may add additional outer membrane acting activities (on the target or associated organisms of a mixed colony or biofilm), bacterial capsule degrading activities, targeting functions, or which affect physiological processes, e.g., vascular permeability. Alternatively, domains may be associated to result in physical affinity between different polypeptides to generate multichain polymer complexes.

The term "nucleic acid" refers to a deoxyribonucleotide, ribonucleotide, or mixed polymer in single- or double-stranded form, and, unless otherwise limited, encompasses known analogues of natural nucleotides that hybridize to nucleic acids in a manner similar to naturally occurring nucleotides. Unless otherwise indicated or by context, a particular nucleic acid sequence includes the complementary sequence thereof.

Throughout the description, where compositions are described as having, including, or comprising specific components, or where processes and methods are described as having, including, or comprising specific steps, it is contemplated that, additionally, there are compositions of the present disclosure that consist essentially of, or consist of, the recited components, and that there are processes and methods according to the present disclosure that consist essentially of, or consist of, the recited processing steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition or a method described herein can be combined in a variety of ways without departing from the spirit and scope of the present disclosure, whether explicit or implicit herein. For example, where reference is made to a particular bacteriophage, that bacteriophage can be used in various embodiments of compositions of the present disclosure and/or in methods of the present disclosure, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

It should be understood that the expression "at least one of" includes individually each of the recited objects after the expression and the various combinations of two or more of the recited objects unless otherwise understood from the context and use. The expression "and/or" in connection with two or more recited objects should be understood to have the same meaning unless otherwise understood from the context.

It should be understood that the order of steps or order for performing certain actions is immaterial so long as the present disclosure remain operable. Moreover, two or more steps or actions may be conducted simultaneously.

The use of any and all examples, or exemplary language herein, for example, "such as" or "including," is intended merely to illustrate better the present disclosure and does not pose a limitation on the scope of the invention unless claimed. No language in the specification should be construed as indicating any non-claimed element as essential to the practice of the present disclosure.

Throughout the description and claims of this specification the word "comprise" and other forms of the word, such as "comprising" and "comprises," means including but not limited to, and is not intended to exclude, for example, other components.

The term "a" is not meant to limit as a singular. In certain embodiments, the term "a" may refer to a plural form. As used throughout this disclosure, the singular forms "a," "an," and "the" include plural reference unless the context clearly dictates otherwise. Thus, for example, a reference to "a composition" includes a plurality of such compositions, as well as a single composition.

The term "about" refers to any minimal alteration in the concentration or amount of an agent that does not change the efficacy of the agent in preparation of a formulation and in treatment of a disease or disorder. In embodiments, the term "about" may include+15% of a specified numerical value or data point.

Ranges can be expressed in this disclosure as from "about" one particular value, and/or to "about" another particular value. When such a range is expressed, another aspect includes from the one particular value and/or to the other particular value. Similarly, when values are expressed as approximations, by use of the antecedent "about," it is understood that the particular value forms another aspect. It is further understood that the endpoints of each of the ranges are significant both in relation to the other endpoint, and independently of the other endpoint. It is also understood that there are a number of values disclosed in this disclosure, and that each value is also disclosed as "about" that particular value in addition to the value itself. It is also understood that throughout the application, data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Nontuberculous Mycobacteria (NTM) and NTM Infection

Historically, human infections due to *Mycobacterium* were due almost exclusively to *Mycobacterium tuberculosis* (TB); the extensive societal impact of this infection is legendary. More recently, other species of mycobacterium causing clinical disease have been identified and, in many geographical regions, cause greater disease burden than TB. These organisms are referred to by a variety of collective names—anonymous or atypical mycobacteria, mycobacteria other than tuberculosis (MOTT), and nontuberculous mycobacteria (NTM). The present disclosure describes NTM organisms.

Nontuberculous mycobacteria (NTM) are naturally-occurring organisms found in water and soil. Similar to TB, NTM infections can occur throughout the body. However, pulmonary infections, lymphadenitis, and skin and soft tissue infections are the most commonly described attributable human infections. NTM infection occurs when a person inhales the organism from their environment. NTM represent over 180 different species and subspecies. Infections with NTM are common especially among patients with cystic fibrosis (see Floto, R. A. & C. S. Haworth, (2015) The growing threat of nontuberculous mycobacteria in CF. J Cyst Fibros 14: 1-2; Floto, R. A., et al., (2016) US Cystic Fibrosis Foundation and European Cystic Fibrosis Society consensus recommendations for the management of non-tuberculous mycobacteria in individuals with cystic fibrosis: executive summary. Thorax 71: 88-90; Martiniano, S. L., et al., (2019) Nontuberculous Mycobacterial Infections in Cystic Fibrosis. Thorac Surg Clin 29: 95-108). There are two main groups of NTM that cause the majority of infections in individuals with cystic fibrosis: the *Mycobacterium avium* complex (MAC) including *M. avium, M. intracellulare* and *M. chimaera*; and the *M. abscessus* complex (MABSC) made up of three subspecies, *M. abscessus* spp. *abscessus, M. abscessus*. spp. *massiliense* and *M. abscessus* spp. *bolettii*. Numerous studies have revealed that *M. abscessus* is the most common NTM species found in cystic fibrosis individuals. The increase in the incidence of *M. abscessus* infections in children with cystic fibrosis is especially notable (see Andrew, E. C., et. al., (2019) Pulmonary *Mycobacterium abscessus* complex in children with cystic fibrosis: A practical management guideline. J Paediatr Child Health 55(5):

502-511; Sabin, A. P., et al., (2017) *Mycobacterium abscessus* Complex Infections in Children: A Review. Curr Infect Dis Rep 19: 46). For cystic fibrosis patients, these NTM infections can also negate the possibility of lung transplantation, as transplant-associated immunosuppression can lead to disseminated disease and high mortality (see Adler, F. R., et al., (2009) Lung transplantation for cystic fibrosis. Proc Am Thorac Soc 6: 619-633.; Sinnott, J. T. t. & P. J. Emmanuel, (1990) Mycobacterial infections in the transplant patient. Semin Respir Infect 5: 65-73).

Solid organ transplant recipients also have an increased risk for infection with NTM due to depressed cell-mediated immunity (see Sinnott, J. T. t. & P. J. Emmanuel, (1990) Mycobacterial infections in the transplant patient. Semin Respir Infect 5: 65-73). NTM infections can become chronic and require ongoing treatment. Nontuberculous mycobacteria can also be referred to as non-tuberculous mycobacteria or non-tuberculosis mycobacteria.

Bacteriophage Therapy

Bacteriophages

Bacteriophages (or phages) are simple, yet incredibly diverse, non-living biological entities consisting of DNA or RNA enclosed within a protein capsid. A bacteriophage is a virus that infects bacteria. As naturally-occurring bacterial parasites, phages are incapable of reproducing independently (i.e., non-living) and are ultimately dependent on a bacterial host for survival. Phages typically bind to specific receptors on the bacterial cell surface, inject their genetic material into the host cell, and then either integrate this material into the bacterial genome (so-called "temperate" phages) and reproduce vertically from mother to daughter cell, or hijack the bacterial replication machinery to produce the next generation of phage progeny and lyse the cell (so-called "lytic" phages). Upon reaching a critical mass of phage progeny, which can be anywhere from a few to over 1000 viral particles, depending on environmental factors, the lytic proteins become active and hydrolyze the peptidoglycan cell wall, releasing novel phage to reinitiate the lytic cycle (see Delbriick M, (1940) The growth of bacteriophage and lysis of the host, J Gen Physiol. 20; 23(5):643-60).

Most phages are infectious only to the bacteria that carry their complementary receptor, which effectively determines lytic phage host range (see Rakhuba D. V., et al., (2010) Bacteriophage receptors, mechanisms of phage adsorption and penetration into host cell, Pol J Microbiol., 59(3):145-55). Host specificity varies among phages and some of which are strain-specific. Bacteria have evolved numerous mechanisms to resist infection by lytic phages, and phages have an equally impressive diversity of mechanisms for breaking this resistance.

The idea of using bacteriophages therapeutically extends back 100 years to their discovery by d'Herelle, but this application has been both difficult and controversial for any bacterial disease (see Kortright, K. E., et al., (2019) Phage Therapy: A Renewed Approach to Combat Antibiotic-Resistant Bacteria. Cell Host Microbe 25: 219-232). Questions about efficacy and utility revolve in part around the specificity of bacteriophages for their bacterial hosts. Phages are typically highly specific for a particular bacterial species, and often for individual isolates of a particular strain. This specificity is a double-edged sword. On one hand, the high specificity provides the ability to target a pathogen with high precision without altering the rest of the human microbiome. It is also associated with low toxicity, with phages having minimal impact on human cells. On the other hand, due to high specificity, a phage useful for one clinical isolate may not be useful for a second subject infected with a different strain of the same bacterium.

The idea of using bacterial viruses therapeutically against bacterial infections has recently gained traction in response to the emergence of multidrug-resistant pathogens such as NTM. As such, bacteriophage therapy provides an effective alternative therapy for treating NTM infections. There are a large number of phages which will attach to specific bacteria and produce enzymes which will lyse that particular bacteria. These bacteriophages can be useful for the detection or treatment of the bacteria for which they are specific. NTM infections can be treated with a composition comprising one or more bacteriophages specific for the suspect bacteria.

Bacteriophage have been used in the past for treatment of plant diseases, such as fireblight as described in U.S. Pat. No. 4,678,750. Also, Bacteriophages have been used to destroy biofilms (e.g., U.S. Pat. No. 6,699,701). In addition, systems using natural bacteriophages that encode biofilm destroying enzymes in general have been described. Art also provides a number of examples of lytic enzymes encoded by bacteriophages that have been used as enzyme dispersion to destroy bacteria (U.S. Pat. No. 6,335,012 and U.S. Patent Application Publication No. 2005/0004030). Lytic bacteriophages specific for pathogenic bacteria may be isolated by the methods described in U.S. Pat. No. 6,699,701.

The present disclosure identifies bacteriophages and their engineered derivatives that are useful in treating NTM infections. In some embodiments, these bacteriophages can provide monotherapy treatment for NTM infections. In certain embodiments, these bacteriophages are provided as a cocktail (e.g., multi-phage cocktails) for treatment for NTM infections. Information with regards to the bacteriophages disclosed in the present disclosure may be accessed via https://phagesdb.org/(The Actinobacteriophage database); Pope, W. H. et al., (2015) Whole genome comparison of a large collection of mycobacteriophages reveals a continuum of phage genetic diversity, 4, e06416; and Hatfull G. F., et al., (2012), Complete genome sequences of 138 mycobacteriophages. J Virol 86: 2382-2384. Table 1 lists bacteriophages and associated GenBank Accession # for bacteriophages disclosed in the present disclosure.

TABLE 1

Bacteriophages and associated GenBank Accession # for bacteriophages disclosed in the present disclosure. Relevant engineered derivatives of bacteriophages disclosed in the present disclosure are also listed.

| Bacteriophage | GenBank Accession # (reference to complete genome) | Relevant Engineered (†) or Mutant (*) Derivatives of Bacteriophages disclosed in present disclosure |
|---|---|---|
| Adephagia | JF704105 | None |
| Adjutor | EU676000 | None |
| Alma | JN699005 | None |
| BPs | EU568876 | †BPsΔ33HTH, †*BPsΔ33HTH_HRM10, *BPs_HRM2, †*BPsΔ33HTH_HRM$^{GD03}$, †*BPsΔ33HTH_HRM$^{GD10}$; |
| Bxb1 | AF271693 | None |
| Cain | MF324913 | None |
| Charlie | JN256079 | None |
| Che9c | AY129333 | None |
| D29 | AF022214 | None |
| Elmo_HRM$^{smeg}$ | Not available | None |
| Faith | Not available | Faith1Δ38-40 |

TABLE 1-continued

Bacteriophages and associated GenBank Accession #
for bacteriophages disclosed in the present disclosure.
Relevant engineered derivatives of bacteriophages
disclosed in the present disclosure are also listed.

| Bacteriophage | GenBank Accession # (reference to complete genome) | Relevant Engineered (†) or Mutant (*) Derivatives of Bacteriophages disclosed in present disclosure |
|---|---|---|
| Fionnbharth | JN831653 | †FionnbharthΔ45Δ47 |
| Fred313 | MF373840 | *Fred313_cpm1 |
| Isca | MN586063 | *Isca_HRM$^{smeg}$ |
| Itos | Not available | None |
| Island3 | HM152765 | None |
| Jeon | MH001450 | None |
| Larva | JN243855 | None |
| Muddy | KF024728 | *Muddy_HRM$^{GD04}$; *Muddy_HRM$^{GD03}$ |
| Nanosmite | Not available | None |
| Peaches | GQ303263 | None |
| Pegleg | KC900379 | None |
| ZoeJ | KJ510412 | †ZoeJΔ45 |

Screening for Phage Susceptibility In some embodiments, the present disclosure provides a method of screening phage susceptibility. Detecting susceptibility includes determining whether or not the nontuberculous mycobacterial infection (e.g., infection caused by *Mycobacterium abscessus*) is depleted, killed, or disabled by one or more compositions disclosed in the present disclosure. In some embodiments, the depletion, killing, or disablement of nontuberculous mycobacterial infection is complete. In some embodiments, the depletion, killing, or disablement of nontuberculous mycobacterial infection is partial. A colony can categorized as either smooth or rough. Section 'Colony Morphology' discusses smooth and rough colony morphology in detail below.

A sample in which a nontuberculous mycobacterial infection is to be detected is derived from a subject. In some embodiments, the sample is derived from a human. A sample can be blood, sputum, phlegm, urine or stool, for example, derived from a subject, in particular, a human (e.g., a human suspected of nontuberculous mycobacterial infection). Samples also include aerosols, such as dust.

Colony Morphology

Colony morphology is often described and in some cases its variation is amenable to genetic analysis. Although the shape of each bacterial colony is unique in detail, colony morphology variants are well known to microbiologists by classical descriptions including "rough" and "smooth."

As used herein, "rough," "rough-type," "R" and "R-type" are used interchangeably to refer to a variant of nontuberculous mycobacteria whose surface, when grown on a plate is characterized visually by an irregular shape in both two and three dimensions. When grown on an agar plate, a colony of rough-type mycobacteria is typically raised from the surface on which it is growing.

As used herein, "smooth," "smooth-type," "S" and "S-type" are used interchangeably to refer to a variant of nontuberculous mycobacteria whose surface, when grown on a plate, is characterized visually by being round in two dimensions and dome-shaped in three dimensions and lacking indentations or sharp angles. The surface of a colony of smooth-type mycobacteria grown on an agar plate can be described as continuous and shining.

Detection of Colony Morphology

Different ways for visual observation of bacterial colonies grown on a solid or a semi-solid medium are well-known in the art. Detection of a colony on a solid or semi-solid medium can be manually scanned with the unaided eye. In other embodiments, colonies can be detected using a microscope. For example, the medium can be observed under a microscope while the medium, positioned on the microscope stage, is manually moved under the microscope objective to scan a portion of the medium for the presence of colonies. The medium can be moved by manipulating the medium itself (e.g., moving the plate containing the medium) or moving the microscope stage on which the medium is placed. In other embodiments, the scanning is carried out automatically. In one embodiment, a motorized microscope stage can be programmed to move the medium under the objective in a search pattern across the surface of the medium such that individual portions of the medium can be observed in turn. In another embodiment, the medium held stationary while a focused light beam, such as a laser, is scanned across the medium and the emitted light is detected by an imaging or non-imaging detector. In one embodiment, the medium is scanned using visible light to detect colonies, e.g., colonies that are large enough to be seen under a microscope. In some embodiments, one or more colonies of nontuberculous mycobacteria grown on a solid or a semi-solid medium is visualized using optical microscopy.

"Molecule," as used herein, refers to a chemical entity that can participate in a binding interaction with another molecule or a chemical moiety expressed by a bacterium or other cell. Examples of molecules include proteins (e.g., lectins; antibodies, especially monoclonal antibodies; cytokines, such as interferons, especially interferon gamma), peptides and small, organic molecules including, for example, lipids, monosaccharides, second messengers and other natural products and metabolites, as well as many drugs.

Detection of molecules can be accomplished in a variety of ways generally known to those of skill in the art. For example, proteins are commonly detected through the use of molecular labels, such as biotin, an enzyme reporter, a fluorophore or a radioactive isotope, that are covalently attached to the protein. Such covalently-labeled proteins can be detected by colorimetric, fluorescent or chemiluminescent techniques or means for detecting radioactivity, such as scintillation counting. Proteins can also be detected using means that do not rely on covalent modification of the protein, such as by exploiting an antibody-antigen interaction. Accordingly, detection can be direct, as when a protein is covalently labeled with a fluorophore that is directly detected by fluorescence microscopy, or indirect, as when an unlabeled protein is detected via a conjugated antibody. Lipid molecules on the surface of nontuberculous mycobacteria can be stained with chemical dyes such as carbol fuchsin, as in acid-fast staining, or with auramine-O or auramine-rhodamine for fluorescence microscopy. Many of the same techniques can be exploited to detect peptides and small, organic molecules, as is known in the art. In some embodiments, the colony morphology score is determined by chemical staining.

Visual observation has led to the hypothesis that rough- and smooth-type colonies of the nontuberculous mycobacteria exhibit differential expression of certain proteins, lipids polysaccharides, and/or molecules comprising combinations of the aforementioned molecules (e.g., glycoproteins, glycolipids, lipoproteins). A lipid as described herein includes phthiocerol dimycocerosate, a sterol, a sulfolipid, a glycolipid (e.g., glycopeptidolipids, trehalose dimycolate), a lipoligosaccharide or a phospholipid (e.g., phosphatidylinositol mannoside). Accordingly, rough and smooth types of the nontuberculous mycobacteria can also be characterized on the basis of differential expression of certain lipids and/or polysaccharides. In some embodiments, the colony morphology score is determined by microarray analysis. In certain embodiments, rough and smooth types of the nontuberculous mycobacteria are characterized on the basis of differential expression of glycopeptidolipids. In certain embodiments, the glycopeptidolipid molecules can be quantified by chromatographic techniques well-known to a person of skilled in the art. In certain embodiments, the glycopeptidolipid molecules can be quantified by thin layer chromatography. In certain embodiments, the glycopeptidolipid molecules can be quantified by liquid chromatography. In certain embodiments, the glycopeptidolipid molecules can be quantified by mass spectrometry.

Rough and smooth nontuberculous mycobacteria can also be characterized by differential gene expression.

It is expected that the observed genetic differences result in differential expression of the proteins encoded by the identified genes. Thus, rough and smooth nontuberculous mycobacteria can also be characterized on the basis of differential protein expression.

The *M. abscessus* complex has been known to display phenotypic heterogeneity, which is an essential factor in the virulence of this mycobacterium. It can be presented as two phenotypically distinct morphotypes based on the presence or absence of glycopeptidolipids (GPL) in the mycobacterial cell wall. Glycopeptidolipids (GPLs) are a class of glycolipids produced by several nontuberculosis-causing members of the *Mycobacterium* genus including pathogenic and non-pathogenic species (see Schorey et al., Glycobiology. 2008 November; 18(11): 832-841.) Smooth-type colony morphology variants possess GPL, which are noticeably absent in rough variants. (See Johansen et al., Nat Rev Microbiol 18, 392-407 (2020)). Rough- and smooth-type colony morphology of the nontuberculous mycobacteria can be detected by differential expression of a glycopeptidolipid molecule. In some embodiments, the expression of glycopeptidolipid molecules in nontuberculous mycobacterium with rough colony morphology is less relative to nontuberculous mycobacterial strain with smooth colony morphology. In some embodiments, the expression of glycopeptidolipid molecules in nontuberculous mycobacterium with rough colony morphology is at least 1.2-fold, at least 1.5-fold, at least 1.7-fold, at least 2-fold, at least 3-fold, at least 4-fold, at least 5-fold, at least 10-fold, at least 20-fold, and at least 50-fold reduced relative to nontuberculous mycobacterial strain with smooth colony morphology. In some embodiments, the expression of glycopeptidolipid molecules in nontuberculous mycobacterium with rough colony morphology is between 1.2-fold to 5-fold, between 1.3-fold to 5-fold, between 1.4-fold to 5-fold, between 1.5-fold to 5-fold, between 1.6-fold to 5-fold, between 1.7-fold to 5-fold, between 1.8-fold to 5-fold, between 1.9-fold to 5-fold, between 2-fold to 5-fold, between 2.5-fold to 5-fold, between 3-fold to 5-fold, between 3.5-fold to 5-fold, between 4-fold to 5-fold, or between 4.5-fold to 5-fold reduced relative to nontuberculous mycobacterial strain with smooth colony morphology. In certain embodiments, the fold reduction is representative of mean value of glycopeptidolipid molecules in known smooth strains in comparison to mean value of glycopeptidolipid molecules in known rough strains. In certain embodiments, the glycopeptidolipid molecule is glycopeptidolipids molecule.

Colony Morphology Score

Based on the methods disclosed herein, a colony morphology can be scored as either rough or smooth. In some embodiments, if a colony is scored as a smooth morphology, it is not susceptible to one or more bacteriophages disclosed hererin. Susceptibility can be tested using a single bacteriophage described herein or multiple bacteriophages (e.g., 2, 3, 4, 5, 6, 7, 8, 9, 10, or more). In some embodiments, if the colony is scored as a smooth morphology, it is not susceptible to one or more of bacteriophages selected from BPsΔ33HTH_HRM, Muddy, ZoeJΔ45, Itos, Faith1Δ38-40, FionnbharthΔ45Δ47, D29_HRMGD40, and Elmo.

Culturing Nontuberculous Mycobacteria

The nontuberculous mycobacterial strains are grown using methods well-known in the art. In some embodiments, the nontuberculous mycobacterial strain is cultured in a nutrient grown medium. In some embodiments, the nontuberculous mycobacteria is grown in Middlebrook 7H9 medium with Oleic acid dextrose citrate (OADC) supplemented with a divalent metal. In some embodiments, the divalent metal is calcium. In some embodiments, the nontuberculous mycobacteria is cultured in nutrient medium at between about 35° C. to about 37° C.

Culturing methods for nontuberculous mycobacteria from subjects with cystic fibrosis are well-known in the art. See Stephenson et al., BMC Pulm Med. 2019; 19: 19.

Rapid High-Throughput Screening for Phage Sensitivity

Reporter phages allows for rapid screening for sensitivity of nontuberculous mycobacteria strains for phage therapy. Phage susceptibility can be assessed by a method based on the efficient production of photons by viable mycobacteria infected with specific reporter phages expressing a fluorescent reporter gene. Light production is dependent on phage infection, expression of the reporter gene, and the level of cellular adenosine triphosphate. [see Jacobs, W. R. et al., 1993]

Construction of Reporter Derivatives of Mycobacteriophages

To produce such reporter mycobacteriophages, mycobacterial species-specific mycobacteriophage genomes are modified by introducing therein transcriptional promoters and reporter genes whose gene product can be sensitively detected. The reporter mycobacteriophages may then be incubated with clinical samples suspected of containing the mycobacteria of interest, either directly of after culture, and the samples tested for the presence of the reporter gene product, thereby diagnosing mycobacterial infection. Any reporter gene well-known to one of skill in the art may be utilized to construct the reporter derivative of mycobacteriophages described herein. Examples of reporter genes include, but are not limited to, the gene encoding firefly luciferase, the gene coding renilla luciferase, the genes encoding click beetle luciferase, the gene encoding green fluorescent protein, the gene encoding enhanced green fluorescent protein, the gene encoding yellow fluorescent protein, the gene encoding red fluorescent protein, the gene encoding cyan fluorescent protein, the gene encoding blue fluorescent protein, the gene encoding beta-galactosidase, the gene encoding beta-glucoronidase, the gene encoding beta-lactamase, the gene encoding mCherry fluorescent protein, the gene encoding chloramphenicol acetyltransferase, and the gene encoding alkaline phosphatase.

It is important to choose a reporter gene whose product would not normally be found in clinical samples, but whose product is also easily detectable. Luciferase reporter genes have been used in many diversified biological systems, including *E. coli*, cyanobacteria, phytopathogenic bacteria, and *Bacillus*. The presence of luciferase reporter genes can be detected by the emission of photons in the presence of a substrate, such as luciferin or decanal. Luciferin and decanal can permeate mycobacteria, and thereby allow for the detection of gene products, such as photons. Since one molecule of the luciferase gene product can yield 0.85 photons of light, it is the most sensitive biological reporter molecule known. The preferred reporter genes of this invention are luciferase reporter genes, such as the Firefly lux gene (FFlux), the *Vibrio fischeri* lux genes and the *Xenorhabdus luminescens* lux genes, as well as the *E. coli* β-galactosidase (lacZ) genes. Luciferase genes, especially the Firefly lux gene, generate a high amount of luminescence activity. They generate photons, the detection of which is simple and sensitive, using commercially available luminometers that can detect 100-1000 molecules of luciferase with a linear relationship to enzyme concentration. In addition, it is unlikely that clinical samples will contain significant levels of endogenous luciferase activity. [see U.S. Pat. No. 6,300, 061]

In choosing transcriptional promoters to be introduced into the mycobacteriophages, it is desirable to use strong promoters since this will increase the sensitivity of the system. In addition, it is important that the promoter be active following mycobacteriophage infection. Promoter candidates currently available are the BCG hsp60 promoter and the L5 gene 71 promoter.

In certain embodiments, the present disclosure provides a composition for screening one or more bacteriophages effective in treating one or more mycobacterial infections, the composition comprising: one or more bacteriophages selected from BPsΔ33HTH-HRM10, Muddy, ZoeJΔ45, Adephagia, Adjutor, Alma, BPs, BPsΔ33, BPsΔ33HTH_HRM10, BPs_HRM2, BPsΔ33HTH_HRMGD03, BPsΔ33HTH_HRMGD10, Bxb1, Cain, Charlie, Che9c, D29, Elmo_HRMsmeg, FionnbharthΔ45Δ47, Fred313_cpm1, Isca, Isca_HRMsmeg, Itos, Island3, Jeon, Larva, Muddy HRMGD04, Nanosmite, Peaches, Pegleg, ZoeJ, Faith1Δ38-40, and a variant of any one or more of the bacteriophages. In certain embodiments, the bacteriophage is capable of expressing a reporter molecule. In certain embodiments, the genomic DNA of the bacteriophage encodes a reporter molecule. In certain embodiments, the genomic DNA of the bacteriophage further encodes a transcriptional promoter.

In certain embodiments, the present disclosure also provides a method of screening for bacteriophages effective in treating mycobacterial infections comprising: incubating the composition comprising the reporter derivative of the bacteriophage in the presence of a mycobacterium; and assessing infectivity of mycobacterium by the bacteriophage.

Compositions Useful for Treating Nontuberculous Mycobacteria (NTM) Infection

In some embodiments, the present disclosure provides one or more compositions useful for treating NTM infection where NTM infection is selected from *M. avium, M. avium* subsp. *hominissuis* (MAH), *M. abscessus, M. chelonae, M. bolletii, M. kansasii, M. ulcerans, M. avium, M. avium* complex (MAC) (*M. avium* and *M. intracellulare*), *M. conspicuum, M. kansasii, M. peregrinum, M. immunogenum, M. xenopi, M. marinum, M. malmoense, M. marinum, M. mucogenicum, M. nonchromogenicum, M. scrofulaceum, M. simiae, M. smegmatis, M. szulgai, M. terrae, M. terrae* complex, *M. haemophilum, M. genavense, M. asiaticum, M. shimoidei, M. gordonae, M. nonchromogenicum, M. triplex, M. lentiflavum, M. celatum, M. fortuitum, M. fortuitum* complex (*M. fortuitum* and *M. chelonae*) or any combination(s) thereof. In certain embodiments, the NTM infection is *M. abscessus*. In certain embodiments, the NTM infection is *M. smegmatis*.

In certain embodiments, one or more compositions useful for treating NTM infection comprises bacteriophages BPsΔ33HTH-HRM10, Muddy, ZoeJΔ45; and one or more bacteriophages selected from Adephagia, Adjutor, Alma, BPs, BPsΔ33, BPsΔ33HTH_HRM10, BPs_HRM2, BPsΔ33HTH_HRMGD03, BPsΔ33HTH_HRMGD10, Bxb1, Cain, Charlie, Che9c, D29, Elmo_HRMsmeg, FionnbharthΔ45Δ47, Fred313_cpm1, Isca, Isca_HRMsmeg, Itos, Island3, Jeon, Larva, Muddy HRMGD04, Nanosmite, Peaches, Pegleg, ZoeJ, Faith1Δ38-40, and a variant of any one or more of the bacteriophages.

In certain embodiments, the present disclosure provides compositions that are useful for treating *Mycobacterium abscessus* infection. In certain embodiments, the composition comprises bacteriophages Muddy, ZoeJΔ45, BPsΔ33HTH-HRM10; and one or more bacteriophages selected from Adephagia, BPs, BPsΔ33HTH_HRMGD03, BPsΔ33HTH_HRMGD10, D29, Elmo_HRMsmeg, FionnbharthΔ45Δ47, Fred313_cpm1, Isca, Itos, Muddy HRMGD04, Faith1Δ38-40, and a variant of any one or more of the bacteriophages.

In certain embodiments, the present disclosure provides compositions that are useful for treating *Mycobacterium smegmatis* infection. In certain embodiments, the composition comprises bacteriophages Muddy, ZoeJΔ45, BPsΔ33HTH-HRM10; and one or more bacteriophages selected from Adephagia, Adjutor, Alma, BPs, BPsΔ33, BPsΔ33HTH_HRM10, BPs_HRM2, Bxb1, Cain, Charlie, Che9c, Isca, Isca_HRMsmeg, Island3, Jeon, Larva, Nanosmite, Peaches, Pegleg, ZoeJ, Faith1Δ38-40, and a variant of any one or more of the bacteriophages.

Methods for Treating Nontuberculous Mycobacteria (NTM) Infection

Each bacterial pathogen's susceptibility to a bacteriophage may vary. As a result, a susceptibility profile is determined. In certain embodiments, a treatment is formulated based on the bacteriophage susceptibility profile. In certain embodiments, a subject infected with a nontuberculous mycobacterial strain is given a colony morphology score based on the methods disclosed herein. In certain embodiments, the nontuberculous mycobacterial infection of the subject is scored as rough-type nontuberculous mycobacterial injection based on the methods disclosed herein. In certain embodiments, the nontuberculous mycobacterial infection of the subject is scored as smooth-type nontuberculous mycobacterial injection based on the methods disclosed herein.

In certain embodiments, a subject infected with a nontuberculous mycobacterial strain which does not have a smooth colony morphology will benefit from administration of one or more compositions of the present disclosure.

In certain embodiments, the treatment comprises more than one bacteriophage to which the bacteria are susceptible (i.e., a "cocktail"). In certain embodiments, the cocktail is formulated using bacteriophages disclosed in the present disclosure. In certain embodiments, the cocktail is capable of killing more than one bacterial strain within the target genus of pathogens and/or reduces the ability of the bacterial pathogens to develop resistance to bacteriophage infection. In certain embodiments, the members of the bacteriophage cocktail can be substituted as needed to minimize risk of resistance developing.

In certain embodiments, the present disclosure provides a method of treating a NTM infection by administering to the subject an effective amount of a composition that comprises bacteriophages BPsΔ33HTH-HRM10, Muddy, ZoeJΔ45; and one or more bacteriophages selected from Adephagia, Adjutor, Alma, BPs, BPsΔ33, BPsΔ33HTH_HRM10, BPs_HRM2, BPsΔ33HTH_HRMGD03, BPsΔ33HTH_HRMGD10, Bxb1, Cain, Charlie, Che9c, D29, Elmo_HRMsmeg, FionnbharthΔ45Δ47, Fred313_cpm1, Isca, Isca_HRMsmeg, Itos, Island3, Jeon, Larva, Muddy HRMGD04, Nanosmite, Peaches, Pegleg, ZoeJ, Faith1Δ38-40, and a variant of any one or more of the bacteriophages.

In certain embodiments, the present disclosure provides a method of treating *M. abscessus* infection by administering to the subject an effective amount of a composition that comprises bacteriophages Muddy, ZoeJΔ45, BPsΔ33HTH-HRM10; and one or more bacteriophages selected from Adephagia, BPs, BPsΔ33HTH_HRMGD03, BPsΔ33HTH_HRMGD10, D29, Elmo_HRMsmeg, FionnbharthΔ45Δ47, Fred313_cpm1, Isca, Itos, Muddy HRMGD04, Faith1Δ38-40, and a variant of any one or more of the bacteriophages.

In certain embodiments, the present disclosure provides a method of treating *M. smegmatis* infection by administering to the subject an effective amount of a composition that comprises bacteriophages Muddy, ZoeJΔ45, BPsΔ33HTH-HRM10; and one or more bacteriophages selected from Adephagia, Adjutor, Alma, BPs, BPsΔ33, BPsΔ33HTH_HRM10, BPs_HRM2, Bxb1, Cain, Charlie, Che9c, Isca, Isca_HRMsmeg, Island3, Jeon, Larva, Nanosmite, Peaches, Pegleg, ZoeJ, Faith1Δ38-40, and a variant of any one or more of the bacteriophages.

In certain embodiments, the present disclosure provides a method of treating a subject infected with a nontuberculous mycobacteria, wherein the subject is identified as infected with a nontuberculous mycobacterial strain which does not have a smooth colony morphology, the method comprising administering to the subject an effective amount of a composition that comprises bacteriophages BPsΔ33HTH-HRM10, Muddy, ZoeJΔ45; and one or more bacteriophages selected from Adephagia, Adjutor, Alma, BPs, BPsΔ33, BPsΔ33HTH_HRM10, BPs_HRM2, BPsΔ33HTH_HRMGD03, BPsΔ33HTH_HRMGD10, Bxb1, Cain, Charlie, Che9c, D29, Elmo_HRMsmeg, FionnbharthΔ45Δ47, Fred313_cpm1, Isca, Isca_HRMsmeg, Itos, Island3, Jeon, Larva, Muddy_HRMGD04, Nanosmite, Peaches, Pegleg, ZoeJ, Faith1Δ38-40, and a variant of any one or more of the bacteriophages.

In certain embodiments, the present disclosure provides a method of treating a subject infected with a nontuberculous mycobacteria, wherein the subject is identified as infected with a nontuberculous mycobacterial strain which does not have a smooth colony morphology, the method comprising administering to the subject an effective amount of a composition that comprises bacteriophages Muddy, ZoeJΔ45, BPsΔ33HTH-HRM10; and one or more bacteriophages selected from Adephagia, BPs, BPsΔ33HTH_HRMGD03, BPsΔ33HTH_HRMGD10, D29, Elmo_HRMsmeg, FionnbharthΔ45Δ47, Fred313_cpm1, Isca, Itos, Muddy HRMGD04, Faith1Δ38-40, and a variant of any one or more of the bacteriophages.

In certain embodiments, the present disclosure provides a method of treating a subject infected with a nontuberculous mycobacteria, wherein the subject is identified as infected with a nontuberculous mycobacterial strain which does not have a smooth colony morphology, the method comprising administering to the subject an effective amount of a composition that comprises bacteriophages Muddy, ZoeJΔ45, BPsΔ33HTH-HRM10; and one or more bacteriophages selected from Adephagia, Adjutor, Alma, BPs, BPsΔ33, BPsΔ33HTH_HRM10, BPs_HRM2, Bxb1, Cain, Charlie, Che9c, Isca, Isca_HRMsmeg, Island3, Jeon, Larva, Nanosmite, Peaches, Pegleg, ZoeJ, Faith1Δ38-40, and a variant of any one or more of the bacteriophages.

Dosage

Dosage can be determined on a specific basis for each specific type of phage in each specific type of infection in each specific host. Thus, those skilled in the art will recognize that the effective dosage will vary depending on the type of infection and virulence of the phage. The concentration of bacteriophage employed for treatment may be determined using phage titration protocols. The concentration of bacteriophage varies depending upon the carrier and method of administration. In one embodiment, the bacteriophage concentration may range from about $10^2$ to about $10^{11}$ (e.g., $10^3$, $10^4$, $10^5$, $10^6$, $10^7$, $10^8$, $10^9$, or $10^{10}$) Plaque Forming Units (PFU)/milliliter (ml). In certain embodiments, the bacteriophage concentration ranges from about $10^7$ to about $10^{11}$ PFU/ml. After dilution with buffer (e.g., phosphate buffered saline, PBS), a final concentration of bacteriophage may yield a phage titer ranging from about $10^6$ to about $10^9$ PFU/ml. This final concentration is for the ready-to-use composition.

In certain embodiments, the composition is administered in a concentration sufficient to reduce or eliminate nontuberculous mycobacteria selected from the group comprising *Mycobacterium avium, Mycobacterium abscessus, Mycobacterium smegmatis, Mycobacterium avium* complex (MAC) (*Mycobacterium avium* and *Mycobacterium intracellulare*), *Mycobacterium bolletti, Mycobacterium chelonae, Mycobacterium ulcerans, Mycobacterium xenopi, Mycobacterium kansasii, Mycobacterium fortuitum* complex (*Mycobacterium fortuitum* and *Mycobacterium chelonae*), *Mycobacterium marinum*, and any combination(s) thereof.

Administration

In certain embodiments, composition comprising bacteriophages of the present disclosure are administered in aqueous environments. Aqueous compositions comprise at least one bacteriophage and a suitable carrier, including, for example, a buffer, such as, for example, phosphate buffered saline and chlorine-free water. Non-aqueous compositions include, but are not limited to, lyophilized compositions or spray-dried compositions comprising at least one bacteriophage. The composition may be a suspension, coating or in tablet, capsule or powder form. More than one delivery vehicle, or carrier, may be used. In certain embodiments, the composition comprising bacteriophages of the present disclosure are administered topically to the sternal wound or skin nodules. In certain embodiments, administration is done using a gauze pad. In certain embodiments, the composition comprising bacteriophages disclosed herein are administered at least once daily (e.g., once a day, twice a day, three times a day).

In certain embodiments, the composition comprising bacteriophages disclosed herein is administered at least once a week (e.g., once a week, twice a week, 3, 4, 5, 6, 7, or more times a week). In certain embodiments, the composition comprising bacteriophages disclosed herein is administered for at least one week (e.g. one, two, three, four, five, six, seven, eight, nine, or more weeks)

In certain embodiments, the composition comprising bacteriophages disclosed herein is administered in the form of a formulation that is administered orally, intravenously, enterally, parenterally, topically, by injection, intramuscularly, intraarterially, intrathecally, intracapsularly, intraorbitally, intracardiacly, intradermally, intraperitoneally, transtracheally, subcutaneously, subcuticularly, intraarticularly, subcapsularly, subarachnoidally, intraspinally, by epidural or infrasternal injection, or by infusion.

Formulation

The bacteriophage treatment may be formulated as a concentrate composition or a ready-to-use composition. A bacteriophage composition may be freeze-dried or spray-dried for storage, if desired. Upon reconstitution, the phage titer can be verified using phage titration protocols and host bacteria. One of skill in the art would be capable of determining bacteriophage titers using widely known bacteriophage assay techniques (Davis et al., Microbiology, 3rd Ed., Harper & Row, Hagerstown, Md. (1980), pp. 874-877, 880-883).

Pharmaceutical Compositions

The compositions of the present disclosure can be prepared by admixing a quantity of phage with a pharmaceutically acceptable carrier. The term "pharmaceutically acceptable" as used herein refers to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

Pharmaceutically acceptable carriers include any of the standard pharmaceutical carriers, such as a phosphate buffered saline solution, water, emulsions (e.g., such as an oil/water or water/oil emulsions), and various types of wetting agents. The compositions also can include stabilizers and preservatives. For examples of carriers, stabilizers and adjuvants, see, e.g., Martin, Remington's Pharmaceutical Sciences, 15th Ed., Mack Publ. Co., Easton, PA [1975]. Pharmaceutically acceptable carriers include buffers, solvents, dispersion media, coatings, isotonic and absorption delaying agents, and the like, that are compatible with pharmaceutical administration. The use of such media and agents for pharmaceutically active substances is known in the art.

Pharmaceutical compositions containing bacteriophages disclosed herein can be presented in a dosage unit form and can be prepared by any suitable method. A pharmaceutical composition should be formulated to be compatible with its intended route of administration. The pharmaceutical compositions may be in a variety of forms. These include, for example, liquid, semi-solid and solid dosage forms, such as liquid solutions (e.g., injectable and infusible solutions), dispersions or suspensions, tablets, pills, powders, liposomes and suppositories. The preferred form will depend upon the intended mode of administration and therapeutic application.

Use of a Three-Phage anti-*M. abscessus* GD01 Cocktail

This section discusses the use of a three-phage (Muddy, ZoeJΔ45, BPsΔ33HTH-HRM10) cocktail to efficiently infect and kill *M. abscessus* GD01 strain. Bacterial strains *M. smegmatis* and *M. abscessus* GD01 susceptibility was tested for a number of phages (Isca, ZoeJ, ZoeJΔ45, BPsΔ33, BPsΔ33HTH, BPsΔ33HTH-HRM1, BPsΔ33HTH-HRM10, and Muddy) using standard plaque assays. Briefly, phage lysates were serially diluted ten-fold and spotted onto *M. smegmatis* mc2155 and *M. abscessus* GD01 lawns. The plaque assays were repeated at least ten times with similar results. The results showed that Muddy killed GD01 strain efficiently. ZoeJ infected GD01 with reduced efficiency of plating (EOP), although the plaques were extremely turbid and difficult to visualize. The lytic derivative of ZoeJΔ45 efficiently infected and killed GD01 strain. BPs and its lytic derivative (BPs-A33HTH) infected GD01 poorly. But isolated host range mutants (HRM1 and HRM10) infected GD01 efficiently and retained *M. smegmatis* infection. HRM1 and HRM10 have single base changes in the portal gene 3 (C2083T and A2695G) conferring R66W and N270D amino acid substitutions, respectively.

Muddy, BPs, and ZoeJ do not kill other *M. abscessus* clinical isolates (GD02, GD03, GD04, GD05) efficiently, and the three-phage cocktail is not a generalizable treatment.

Figure 7:
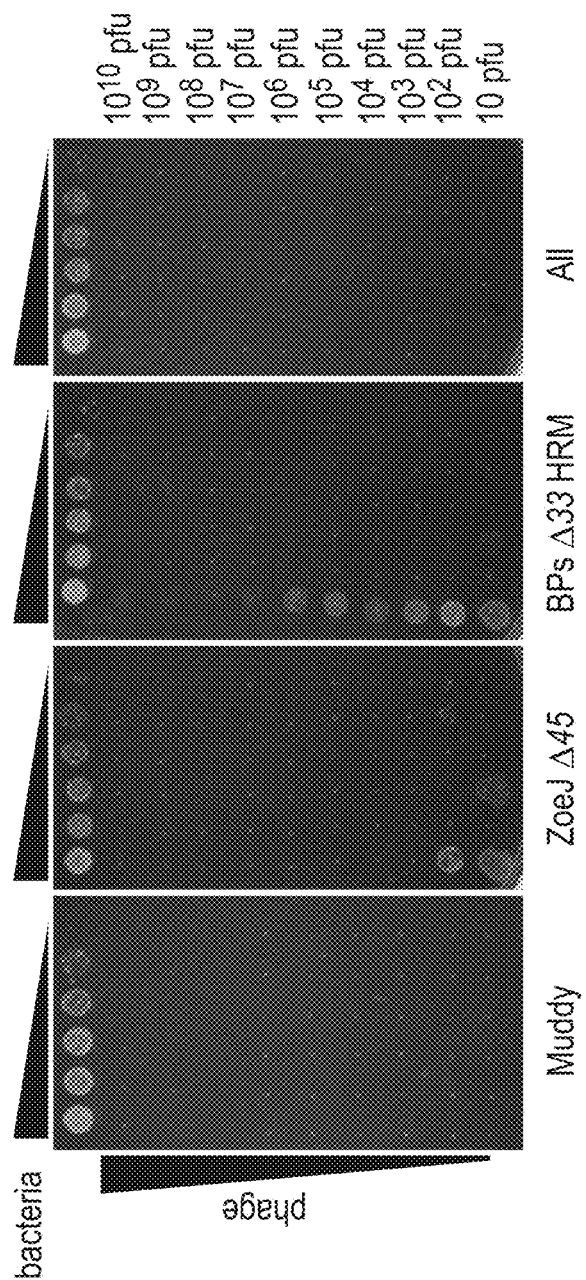
FIG. 7 are images from plaque assays performed to test susceptibility of three-phage cocktail.

Identification of Three-Phage anti-*M. abscessus* GD01 Cocktail: Briefly, *M. abscessus* GD01 (~108 colony forming units, cfu/mL) was serially diluted ten-fold in 11 replicates, and either no phage was added or phage was added at varying concentrations (101 PFU/mL, 102 PFU/mL, 103 PFU/mL, 104 PFU/mL, 105 PFU/mL, 106 PFU/mL, 107 PFU/mL, 108 PFU/mL, 109 PFU/mL, or 1010 PFU/mL). Cultures were incubated at 37° C. for 24 hours, and 3-µl aliquots were plated onto solid media and incubated for 7 days. These assays were repeated at least three times with similar results. A representative experiment is shown in FIG. 7. The experimental results showed that each of the three phages—Muddy, ZoeJΔ45, BPsΔ33HTH-HRM10 infected and killed GD01 strain over a wide range of cell and phage concentrations, although ZoeJΔ45 and BPsΔ33HTH-HRM10 killed inefficiently at low phage concentrations and higher bacterial numbers. However, as shown in images from plaque assays in FIG. 7, no bacterial survival in vitro was observed using the three-phage cocktail.

Mycobacteriophage Cocktail Preparation: Phages were grown on *M. smegmatis* mc$^2$155 using solid media and recovered by diffusion into phage buffer (68 mM NaCl, 10 mM Tris HCl pH 7.5, 10 mM MgSO$_4$, 10 mM CaCl$_2$)), yielding lysates with titers of >8×10$^{10}$ PFU ml$^{-1}$. Phage particles were precipitated in 10% PEG8000 and 1 M NaCl, collected by centrifugation, and resuspended in phage buffer. Following clarification by centrifugation, cesium chloride (CsCl) was added to a density of 1.5 g cm$^{-3}$ (4.1 M), subjected to equilibrium density gradient centrifugation for 16 hours, the visible phage band collected (~1.5 ml), centrifuged similarly again, and stored at 4° C.; this yielded 1-2 ml of phage with titers of 10$^{12}$-10$^{14}$ PFU ml$^{-1}$. For cocktail preparation, 1 ml of each phage sample was dialysed against 1 liter of phosphate buffered saline (PBS; BupH PBS Thermo Scientific; 0.1 M Na$_2$HPO$_4$, 0.15 M NaCl$_2$, pH 7.2) four times for a minimum of 3 hours each. Dialysis reduced the cesium concentration to less than 190 parts per billion, as detected by inductively coupled plasma mass spectrometry (ICP-MS). Phage samples had undetectable levels of endotoxin as assessed using an EndoZyme II (Hyglos GmbH) assay. Samples were combined to form a three-phage cocktail, each at 10$^{11}$ PFU ml-1. Phage titers dropped no more than eightfold over a 1-month period when stored in PBS at 10° C., and cocktail batches were prepared monthly.

Phage Administration to Human Subject: The phage cocktail was diluted in PBS to a concentration of 10$^9$ PFU/mL. Twenty-four hours following a single topical test dose in the sternal wound, i.v. therapy was initiated with the three-phage cocktail (10$^9$ plaque forming units (PFU) per dose of each phage) every 12 hours for at least 32 weeks. During the first 2 days of treatment, the human subject felt sweaty and flushed but had no fever or changes on physical examination. Otherwise phage treatment was well tolerated throughout, without significant side effects. After 9 days, the human subject was discharged and 12 hours i.v. administration of the cocktail was continued. After 1 month of treatment, the sternal wound, which had received a topical test dose, had improved more than the other skin lesions and topical daily phage therapy was commenced for both. Over the next 6 months, the human subject continued to improve clinically with gradual healing of surgical wound and skin lesions and improvement of lung function and liver function. Weight increase was also observed, despite cessation of overnight supplemental feedings. A repeat CT-PET scan 6 weeks into phage treatment showed resolution of FDG activity of the previously enlarged node at the porta hepatis, although sternal and skin lesion activity remained.

Cytokine Response to three-Phage Cocktail: *M. abscessus* was not isolated from serum or sputum at any point after initiation of phage treatment, although *M. abscessus* was cultured from swabs of slowly resolving skin nodules at 1, 3, 4, and 5 months. Sera showed no evidence of phage neutralization, although weak antibody responses to phage proteins were seen. Among the weak cytokine responses were interferon-γ (IFNγ), interleukin-6 (IL-6) and IL-10 after 16 days of treatment, tumour necrosis factor-α (TNFα), IL-6 and IL-10 after 1 month of treatment, and IL-6 after 3 and 4 months of treatment. Phages were detected in serum 1 day after starting treatment, and reached titers in excess of $10^9$ PFU/ml; digital polymerase chain reaction (dPCR) performed on EDTA blood samples had a similar temporal profile, although the maximum phage load detected was ~$10^5$ copies per ml; these observations are consistent with phage replication. Serum phage concentrations fell below detection limits 1 week after starting treatment, although two later samples had mycobacteriolytic activity. Sputum samples were predominantly saliva and did not contain detectable lytic activity, although a purulent sputum sample collected 9 days after initiation of treatment had a high phage titer ($10^{10}$ PFU/ml). Lower phage concentrations were detected in feces 4 and 6 days post treatment, and in wound swabs at 3 and 5 days post treatment. *M. abscessus* isolates were recovered from skin nodule swabs at 20, 72, 107, and 121 days after treatment initiation but remained sensitive to each phage in the cocktail. It is plausible that phage resistance is associated with reduced virulence.

EXAMPLES

The following Examples are merely illustrative and are not intended to limit the scope or content of the invention in any way.

Example 1—Testing Bacteriophages for *M. smegmatis* on *M. abscessus* Strains

This example describes testing of bacteriophages that efficiently infect and kill *M. smegmatis* strain on *M. abscessus* strains. *M. smegmatis* $mc^2$ 155, a laboratory stock strain was grown as described in Jacobs-Sera, D. et al. (2012), *Virology*, 434, 187-201. *M abscessus* strains GD01 and GD02 are designated strains from *M. abscessus* subsp. *massiliense* (see Dedrick, R. M., et al., (2019) Engineered bacteriophages for treatment of a subject with a disseminated drug resistant *Mycobacterium abscessus*, Nature Medicine, 25: 730-733). *M. abscessus* strains were grown in Middlebrook 7H9 medium with OADC and 1 mM $CaCl_2$) for 4-5 d at 37° C., with shaking. These *M. abscessus* strains grow with a doubling time of approximately 6 hours, with isolated colonies visible on solid medium in 5-7 days. For plaque assays, cultures were sonicated briefly in a cup-hom sonicator (Q500, Qsonica) at 30% amplitude with 15 seconds on and 10 seconds off until visibly dispersed. Adephagia, Adjutor, Alma, BPs, Bxb1, Cain, Charlie, Che9c, Island3, Jeon, Larva, Muddy, Nanosmite, Peaches, and Pegleg bacteriophage lysates were serially diluted tenfold and spotted onto *M. smegmatis* $mc^2$ 155 and *M. abscessus* GD01 and GD02 lawns. Standard plaque assays were performed using well-known methods (For example: Jacobs-Sera, D. et al. (2012), *Virology*, 434, 187-201). The assays were repeated at least ten times with similar results, and a representative experiment is shown in FIG. 1. FIG. 1 shows agar plates illustrating phage susceptibilities of *M. smegmatis*, *M. abscessus* GD01 (M ab GD01), and *M. abscessus* GD02 (M ab GD02) using standard plaque assays. Each plaque indicates an initial infection with one phage. Bacteriophages that infected one or more *M. abscessus* strains are indicated by a star. As shown in FIG. 1, Adephagia infected *M. abscessus* GD01 strain at higher efficiency. *M. abscessus* GD02 was not infected by Adephagia. BPs infected both *M. abscessus* GD01 and GD02 strains but only at certain concentrations. GD01 strain was susceptible to BPs at varying concentration, while GD02 strain was susceptible to BPs at only high concentrations. Muddy efficiently infected *M. abscessus* GD01, but GD02 strain was susceptible to Muddy at only high concentrations. This example also shows that *M. abscessus* GD01 and *M. abscessus* GD02 strains differ in their susceptibilities.

Example 2—Mutational Expansion of Host Range Mutant Derivatives

Figure 2:
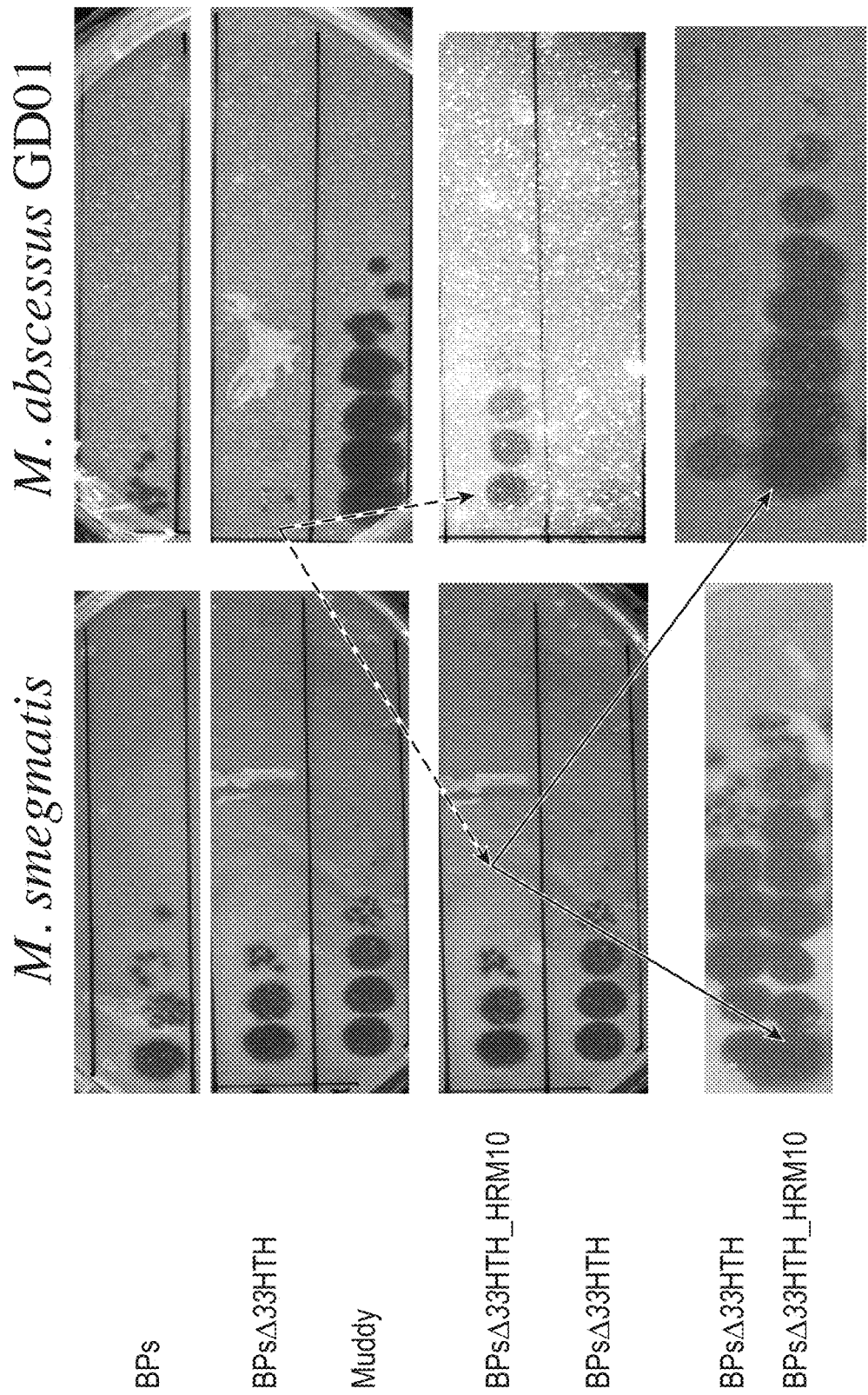
FIG. 2 shows agar plates illustrating phage susceptibilities of *M. smegmatis* and *M. abscessus* GD01 using standard plaque assays. Arrows in FIG. 2 denote the plating sequence. A plaque obtained by plating phage BPs 33HTH on *M. abscessus* GD01 was picked and replaced on the two bacterial strains indicated (dashed arrow). From this, a plaque was picked from the *M. smegmatis* plate and replicated on the two strains (bolded arrow), demonstrating that the derivative infects the two strains with equal efficiency.

This example discusses mutational expansion of host range of temperate bacteriophages. Temperate bacteriophages (e.g., BPs) can choose between the lytic and lysogenic pathways of development. The lytic pathway is similar to that of virulent phages. In the lysogenic pathway, the virus remains dormant until induction. Temperate bacteriophage, BPs, was isolated and clear plaque mutants were characterized. FIG. 2 shows agar plates illustrating phage susceptibilities of *M. smegmatis* and *M. abscessus* GD01 using standard plaque assays. Arrows in FIG. 2 denote the plating sequence. A plaque obtained by plating phage BPsΔ33HTH on *M. abscessus* GD01 was picked and replaced on the two bacterial strains indicated (dashed arrow). From this, a plaque was picked from the *M. smegmatis* plate and replicated on the two strains (bolded arrow), demonstrating that the derivative infects the two strains with equal efficiency.

As shown in FIG. 2, BPs and BPsΔ33 plated inefficiently on *M. abscessus* GD01 strain. A host range mutant (HRM) derivative of BPs, BPsΔ33HTH_HRM10, was isolated by picking plaques from *M. abscessus* GD01 strain and plating on an *M. smegmatis* lawn. This mutant grows on both *M. smegmatis* and *M. abscessus* GD01. BPsΔ33HTH_HRM10 has a mutation in the phage portal gene (gene 3).

Example 3—Engineered Derivative of Bacteriophage ZoeJ

Figure 3C:
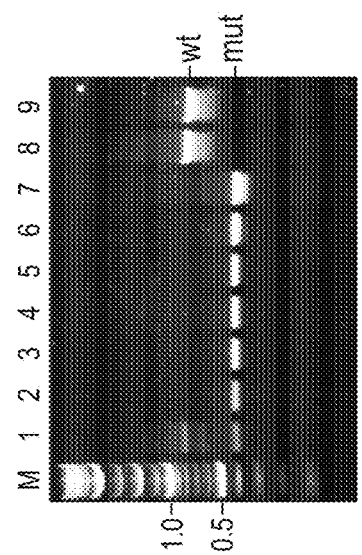
FIG. 3C is an agarose gel showing results from gel electrophoresis of PCR products. M denotes DNA marker; Lane 1 is a mixed primary plaque containing both wild type and mutant alleles, lanes 2-7 denote individual mutant derivatives of ZoeJ (mut) derived from the mixed primary plaque shown in Lane 1, in which repressor gene (45) has been deleted; lanes 8-9 denote wild-type (WT) ZoeJ.
Figure 3A:
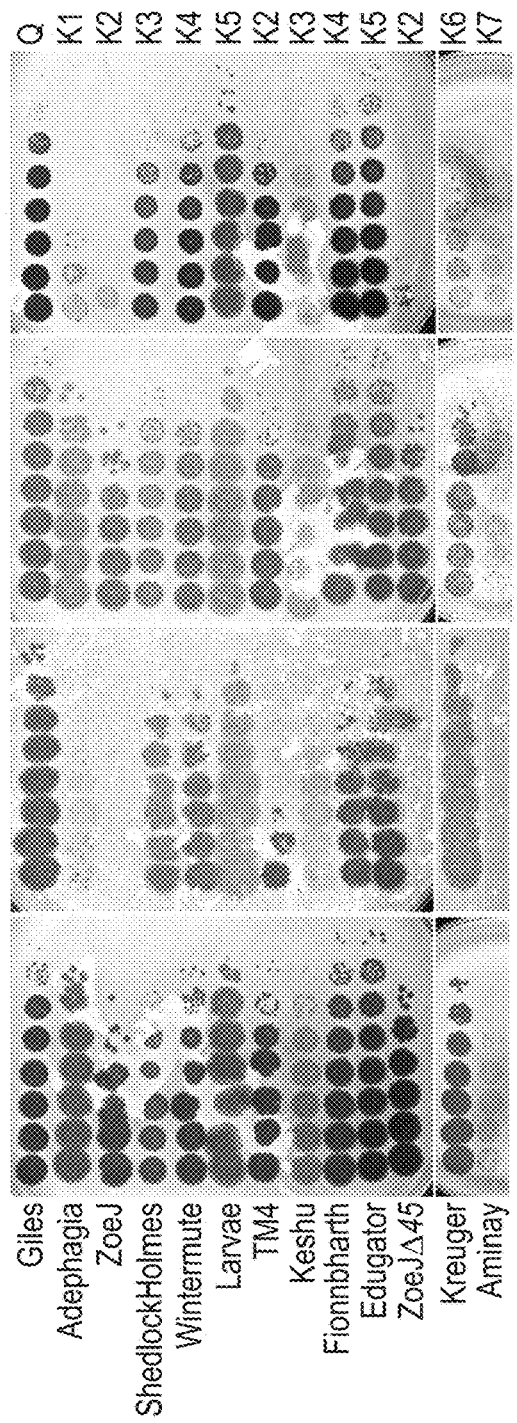
FIG. 3A are agar plates illustrating phage susceptibilities of different strains of *M. smegmatis* (mc2155, mc2155 (ZoeJ), mc2155pMH94, mc2155pKC01(pMH94:ZoeJ gp45)) using microtiter plaque assays.
Figure 3B:
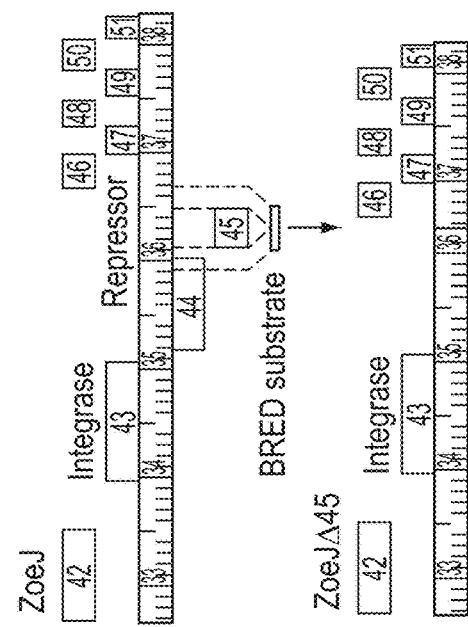
FIG. 3B shows a genomic map illustrating the construction of engineered derivative of bacteriophage ZoeJ by deletion of repressor gene (45).
Figure 3D:
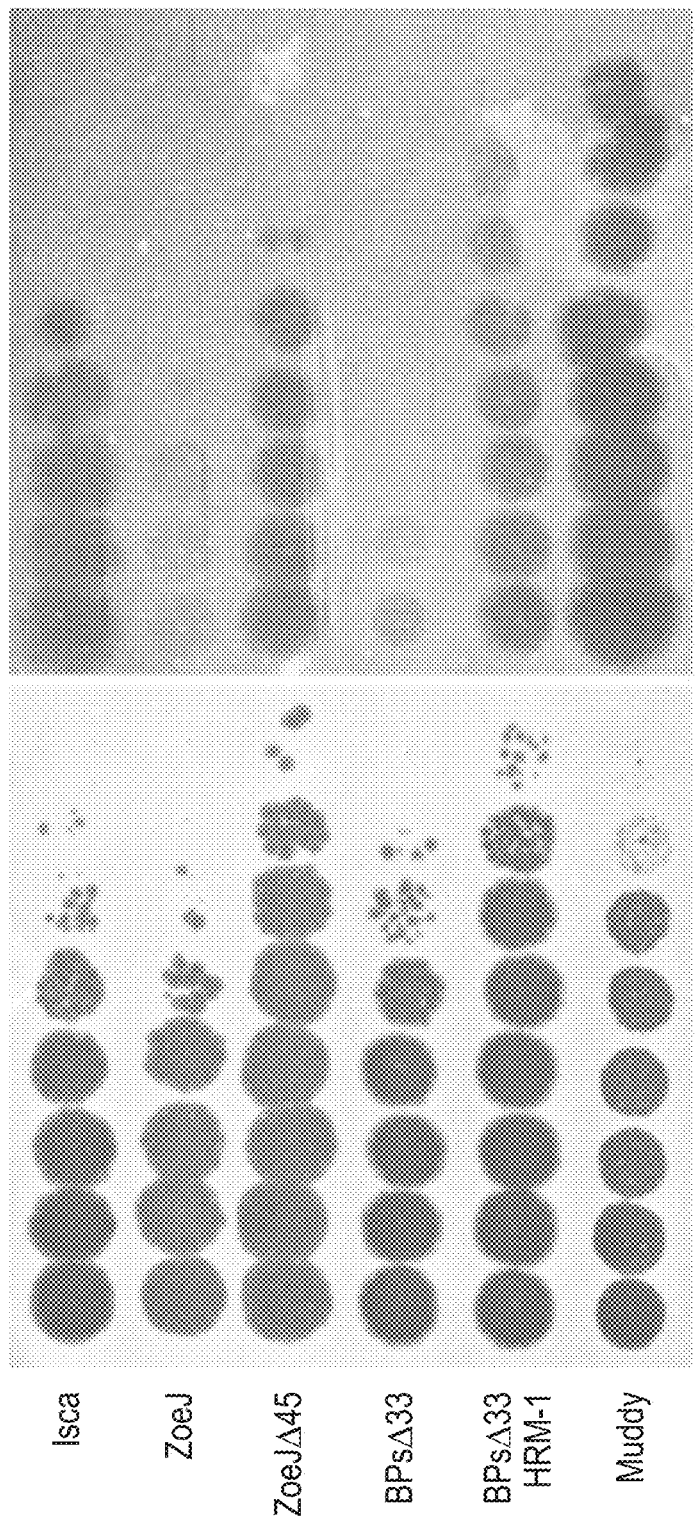
FIG. 3D are agar plates illustrating phage susceptibilities of *M. smegmatis* (mc2155) and *M. abscessus* GD01 using microtiter plaque assays.

This example discusses engineering of a lytic derivative of bacteriophage, ZoeJ. Using Bacteriophage Recombineering of Electroporated DNA (BRED) engineering, repressor gene (45) in ZoeJ was deleted (see Dedrick, R. M., et. al, (2019) Mycobacteriophage ZoeJ: A broad host-range close relative of mycobacteriophage TM4. Tuberculosis (Edinb) 115: 14-23; Marinelli, L. J., et al., (2008), PLoS ONE, BRED: a simple and powerful tool for constructing mutant and recombinant bacteriophage genomes. 3: e3957). FIG. 3A illustrates phage susceptibilities of different strains of *M. smegmatis* ($mc^2$155, $mc^2$155 (ZoeJ), $mc^2$155pMH94, $mc^2$155pKC01)) using microtiter plaque assays. FIG. 3B shows a genomic map illustrating the construction of engineered derivative of bacteriophage ZoeJ by deletion of repressor gene (45). FIG. 3C is an agarose gel showing results from gel electrophoresis of PCR products. M denotes DNA marker; Lane 1 is a mixed primary plaque containing both wild type and mutant alleles, lanes 2-7 denote individual mutant derivatives of ZoeJ (mut) derived from the mixed primary plaque shown in Lane 1, in which repressor gene (45) has been deleted; lanes 8-9 denote wild-type (WT) ZoeJ. FIG. 3D illustrates phage susceptibilities of M. smegmatis (mc²155) and M. abscessus GD01 using microtiter plaque assays.

Example 4—Phage Susceptibilities of M. smegmatis and M. abscessus Strain (GD01, GD03, and GD04)

Figure 4:
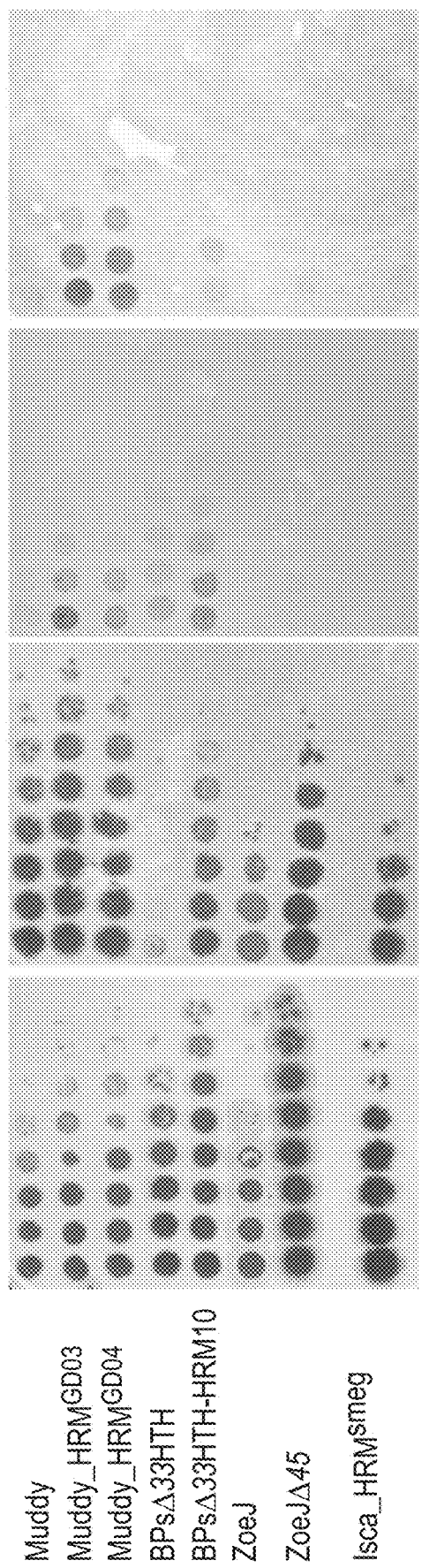
FIG. 4 shows agar plates illustrating phage susceptibilities of *M. smegmatis* and *M. abscessus* strains (GD01, GD03, and GD04) using standard plaque assays. *M. smegmatis* and *M. abscessus* strains (GD01, GD03, and GD04) were tested for their susceptibility towards Muddy, MuddyGD03, MuddyGD04, BPsΔ33, BPsΔ33GD01, ZoeJ, ZoeJΔ45, or Isca_HRMsmeg.

In this example, numerous bacteriophages and engineered derivatives were tested on M. smegmatis and M. abscessus strains GD01, GD03, and GD04. FIG. 4 shows agar plates illustrating phage susceptibilities of M. smegmatis and M. abscessus strains (GD01, GD03, and GD04) using standard plaque assays. M. smegmatis and M. abscessus strains (GD01, GD03, and GD04) were tested for their susceptibility towards Muddy, MuddyGD03, MuddyGD04, BPsΔ33, BPsΔ33GD01, ZoeJ, ZoeJΔ45, or Isca_HRMsmeg. Phages were serially diluted and spotted onto M. smegmatis, M. abscessus GD01, M. abscessus GD03, and M. abscessus GD04. As shown in FIG. 4, Muddy does not efficiently infect GD03 or GD04 strains. Host range mutants of Muddy (Muddy_HRMGD03 and Muddy HRMGD04) infected better but did not efficiently kill GD03 and GD04 strains. BPsΔ33HTH does not efficiently infect GD01. However, BPsΔ33HTH_HRM10 efficiently infected and killed only GD01 strain. ZoeJ was turbid on GD01 strain. Its engineered derivative, ZoeJΔ45 efficiently infected and killed only GD01 strain. Host range mutant of Isca (Isca_HRMsmeg) does not efficiently infect GD01 strain when grown on M. smegmatis.

Example 5—Phage Sensitivity Profiles of NTM Strains

A number of clinical isolates primarily M. abscessus strains with bacteriophages (including engineered derivatives of certain bacteriophages) were screened using standard plaque assays (see Jacobs-Sera, D. et al. (2012), Virology, 434, 187-201).

Tables 2-5 indicate a matrix of the bacteriophage strains that were tested and the phages that were therapeutically useful, i.e. bacteriophages that both efficiently infected and killed the bacterial strains are indicated by a tick mark.

TABLE 2

Phage infection profile for D29 and Muddy bacteriophages, including engineered Muddy bacteriophage derivative. Strain designation is shown in left, and phages are listed in the columns. A check indicates that the phage efficiently infected and killed that bacterial strain

| Strain # | Species | D29 | Muddy | Muddy_HRM$^{GD04}$ |
|---|---|---|---|---|
| GD01 | M. abscessus | | ✓ | |
| GD02 | M. abscessus | | | |
| GD07 | BCG (a M. bovis strain) | ✓ | ✓ | |
| GD05 | M. abscessus | | | |
| GD06 | M. chelonae | | | |
| GD04 | M. abscessus | | | |
| GD03 | M. abscessus | | | |
| GD08 | M. abscessus | | | |
| GD09 | M. abscessus | | | |
| GD10 | M. abscessus | | ✓ | |
| GD11 | M. abscessus | | | |
| GD12 | M. abscessus | | | |
| GD13 | M. abscessus | | | |
| GD14 | M. abscessus | | | |
| GD15 | M. abscessus | | | |
| GD16 | M. abscessus | | | |
| GD17 | M. abscessus | | | |
| GD18 | M. abscessus | | | |
| GD19 | M. abscessus | | ✓ | |
| GD20 | M. abscessus | | | |
| GD21 | M. abscessus | | | |
| GD22 | M. abscessus | | | |
| GD23 | M. abscessus | | | |
| GD24 | M. abscessus | | | |
| GD25 | M. abscessus | | ✓ | |
| GD26 | M. abscessus | | | |
| GD27 | M. abscessus | | | ✓ |
| GD28 | M. abscessus | | | |
| GD29 | M. abscessus | | | |
| GD30 | M. massiliense | | | |
| GD31 | BCG | | | |
| GD32 | M. abscessus | | | |
| GD33 | M. abscessus | | | |
| Totals: | | 1 | 5 | 1 |

TABLE 3

Phage infection profile for BPs bacteriophage and its engineered derivatives. Strain designation is shown in left, and phages are listed in the columns. A check indicates that the phage efficiently infected and killed that bacterial strain.

| Strain # | Species | BPsΔ33HTH_HRM10 | BPsΔ33HTH_HRM$^{GD03}$ | BPsΔ33HTH_HRM$^{GD10}$ |
|---|---|---|---|---|
| GD01 | M. abscessus | ✓ | | |
| GD02 | M. abscessus | | | |
| GD07 | BCG (a M. bovis strain) | | | |
| GD05 | M. abscessus | | | |
| GD06 | M. chelonae | | | |
| GD04 | M. abscessus | | | |
| GD03 | M. abscessus | | | |
| GD08 | M. abscessus | ✓ | | |
| GD09 | M. abscessus | | | |
| GD10 | M. abscessus | | | ✓ |
| GD11 | M. abscessus | | | |

TABLE 3-continued

Phage infection profile for BPs bacteriophage and its engineered derivatives. Strain designation is shown in left, and phages are listed in the columns. A check indicates that the phage efficiently infected and killed that bacterial strain.

| Strain # | Species | BPsΔ33HTH_HRM10 | BPsΔ33HTH_HRM$^{GD03}$ | BPsΔ33HTH_HRM$^{GD10}$ |
|---|---|---|---|---|
| GD12 | M. abscessus | | | |
| GD13 | M. abscessus | | | |
| GD14 | M. abscessus | | | |
| GD15 | M. abscessus | | | |
| GD16 | M. abscessus | | ✓ | |
| GD17 | M. abscessus | | ✓ | |
| GD18 | M. abscessus | | | |
| GD19 | M. abscessus | | | |
| GD20 | M. abscessus | ✓ | | |
| GD21 | M. abscessus | | ✓ | |
| GD22 | M. abscessus | | ✓ | |
| GD23 | M. abscessus | | | |
| GD24 | M. abscessus | | ✓ | |
| GD25 | M. abscessus | | | |
| GD26 | M. abscessus | ✓ | ✓ | |
| GD27 | M. abscessus | ✓ | ✓ | |
| GD28 | M. abscessus | | | |
| GD29 | M. abscessus | | | |
| GD30 | M. massiliense | | | |
| GD31 | BCG | | | |
| GD32 | M. abscessus | | | |
| GD33 | M. abscessus | | | |
| | Totals: | 5 | 7 | 1 |

TABLE 4

Phage infection profile for bacteriophage Isca and bacteriophage derivatives Elmo_HRM$^{smeg}$ and FionnbharthΔ45Δ47BPs. Strain designation is shown in left, and phages are listed in the columns. A check indicates that the phage efficiently infected and killed that bacterial strain.

| Strain # | Species | Itos | Isca | Elmo_HRM$^{smeg}$ | FionnbharthΔ45Δ47 |
|---|---|---|---|---|---|
| GD01 | M. abscessus | ✓ | ✓ | | |
| GD02 | M. abscessus | | | ✓ | |
| GD07 | BCG (a M. bovis strain) | | | | ✓ |
| GD05 | M. abscessus | | | | |
| GD06 | M. chelonae | | | | |
| GD04 | M. abscessus | | | | |
| GD03 | M. abscessus | | | | |
| GD08 | M. abscessus | ✓ | | | |
| GD09 | M. abscessus | | | | |
| GD10 | M. abscessus | | | | |
| GD11 | M. abscessus | | | | |
| GD12 | M. abscessus | | | | |
| GD13 | M. abscessus | | | | |
| GD14 | M. abscessus | | | | |
| GD15 | M. abscessus | | | | |
| GD16 | M. abscessus | | | | |
| GD17 | M. abscessus | | | | |
| GD18 | M. abscessus | | | | |
| GD19 | M. abscessus | | | | |
| GD20 | M. abscessus | ✓ | | | |
| GD21 | M. abscessus | | | | |
| GD22 | M. abscessus | ✓ | | | |
| GD23 | M. abscessus | | | | |
| GD24 | M. abscessus | | | | |
| GD25 | M. abscessus | | | | |
| GD26 | M. abscessus | | | | |
| GD27 | M. abscessus | ✓ | | | |
| GD28 | M. abscessus | | | | |
| GD29 | M. abscessus | | | | |

TABLE 4-continued

Phage infection profile for bacteriophage Isca and bacteriophage derivatives Elmo_HRM$^{smeg}$ and FionnbharthΔ45Δ47BPs. Strain designation is shown in left, and phages are listed in the columns. A check indicates that the phage efficiently infected and killed that bacterial strain.

| Strain # | Species | Itos | Isca | Elmo_HRM$^{smeg}$ | FionnbharthΔ45Δ47 |
|---|---|---|---|---|---|
| GD30 | M. massiliense | | | | |
| GD31 | BCG | | | | |
| GD32 | M. abscessus | | | | |
| GD33 | M. abscessus | | | | |
| | Totals: | 5 | 1 | 1 | 1 |

TABLE 5

Phage infection profile for bacteriophage derivatives Fred313_cpm and ZoeJΔ45. Strain designation is shown in left, and phages are listed in the columns. A check indicates that the phage efficiently infected and killed that bacterial strain.

| Strain # | Species | Fred313_cpm1 | ZoeJΔ45 |
|---|---|---|---|
| GD01 | M. abscessus | | |
| GD02 | M. abscessus | | ✓ |
| GD07 | BCG (a M. bovis strain) | ✓ | |
| GD05 | M. abscessus | | |
| GD06 | M. chelonae | | |
| GD04 | M. abscessus | | |
| GD03 | M. abscessus | | |
| GD08 | M. abscessus | | |
| GD09 | M. abscessus | | |
| GD10 | M. abscessus | | |
| GD11 | M. abscessus | | |
| GD12 | M. abscessus | | |
| GD13 | M. abscessus | | |
| GD14 | M. abscessus | | |
| GD15 | M. abscessus | | |
| GD16 | M. abscessus | | |
| GD17 | M. abscessus | | |
| GD18 | M. abscessus | | |
| GD19 | M. abscessus | | |
| GD20 | M. abscessus | | |
| GD21 | M. abscessus | | |
| GD22 | M. abscessus | | |
| GD23 | M. abscessus | | |
| GD24 | M. abscessus | | |
| GD25 | M. abscessus | | |
| GD26 | M. abscessus | | |
| GD27 | M. abscessus | | |
| GD28 | M. abscessus | | |
| GD29 | M. abscessus | | |
| GD30 | M. massiliense | | |
| GD31 | BCG | | |
| GD32 | M. abscessus | | |
| GD33 | M. abscessus | | |
| | Totals: | 1 | 1 |

Table 6 indicate bacterial strains that were not infected or killed by any bacteriophage.

TABLE 6

List of bacterial strains that were not infected or killed by any bacteriophage. A check indicates that none of the phage candidates efficiently infected and/or killed that bacterial strain.

| Strain # | Species | None |
|---|---|---|
| GD01 | M. abscessus | |
| GD02 | M. abscessus | |
| GD07 | BCG (a M. bovis strain) | |
| GD05 | M. abscessus | ✓ |
| GD06 | M. chelonae | ✓ |
| GD04 | M. abscessus | ✓ |
| GD03 | M. abscessus | ✓ |
| GD08 | M. abscessus | |
| GD09 | M. abscessus | ✓ |
| GD10 | M. abscessus | |
| GD11 | M. abscessus | ✓ |
| GD12 | M. abscessus | ✓ |
| GD13 | M. abscessus | ✓ |
| GD14 | M. abscessus | ✓ |
| GD15 | M. abscessus | ✓ |
| GD16 | M. abscessus | |
| GD17 | M. abscessus | |
| GD18 | M. abscessus | ✓ |
| GD19 | M. abscessus | |
| GD20 | M. abscessus | |
| GD21 | M. abscessus | |
| GD22 | M. abscessus | |
| GD23 | M. abscessus | ✓ |
| GD24 | M. abscessus | |
| GD25 | M. abscessus | |
| GD26 | M. abscessus | |
| GD27 | M. abscessus | |
| GD28 | M. abscessus | ✓ |
| GD29 | M. abscessus | ✓ |
| GD30 | M. massiliense | ✓ |
| GD31 | BCG | No data |
| GD32 | M. abscessus | ✓ |
| GD33 | M. abscessus | ✓ |
| | Totals: | 16 |

Example 6—Monotherapy Treatment with Phages

Figure 5A:
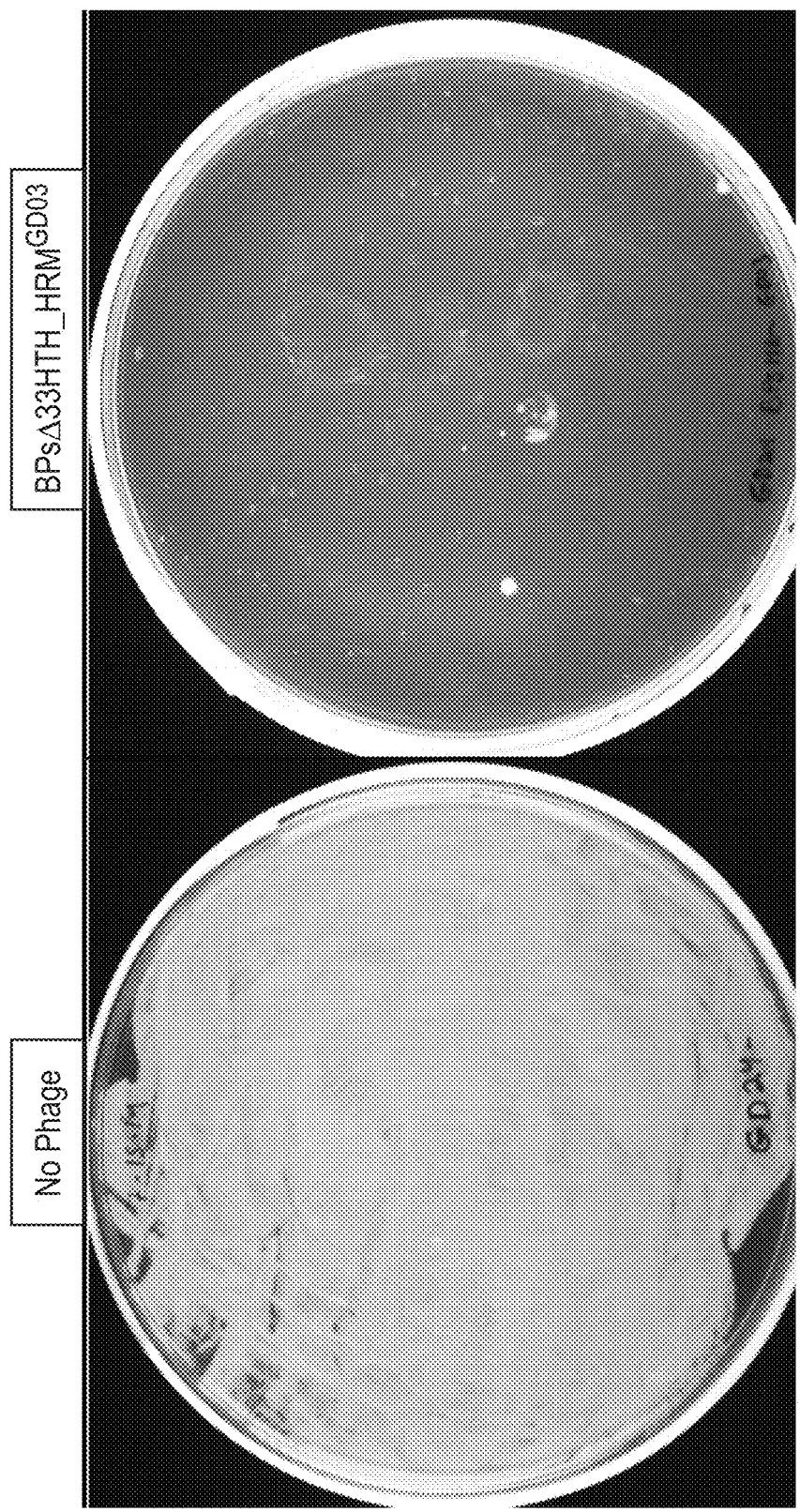
FIG. 5A shows agar plates illustrating phage susceptibility of *M. abscessus* GD 24 strain. Agar plate on left shows heavy bacterial growth in the absence of a phage whereas agar plate on right shows growth of few colonies due to susceptibility of *M. abscessus* GD 24 strain to BPsΔ33HTH_HRMGD03.
Figure 5B:
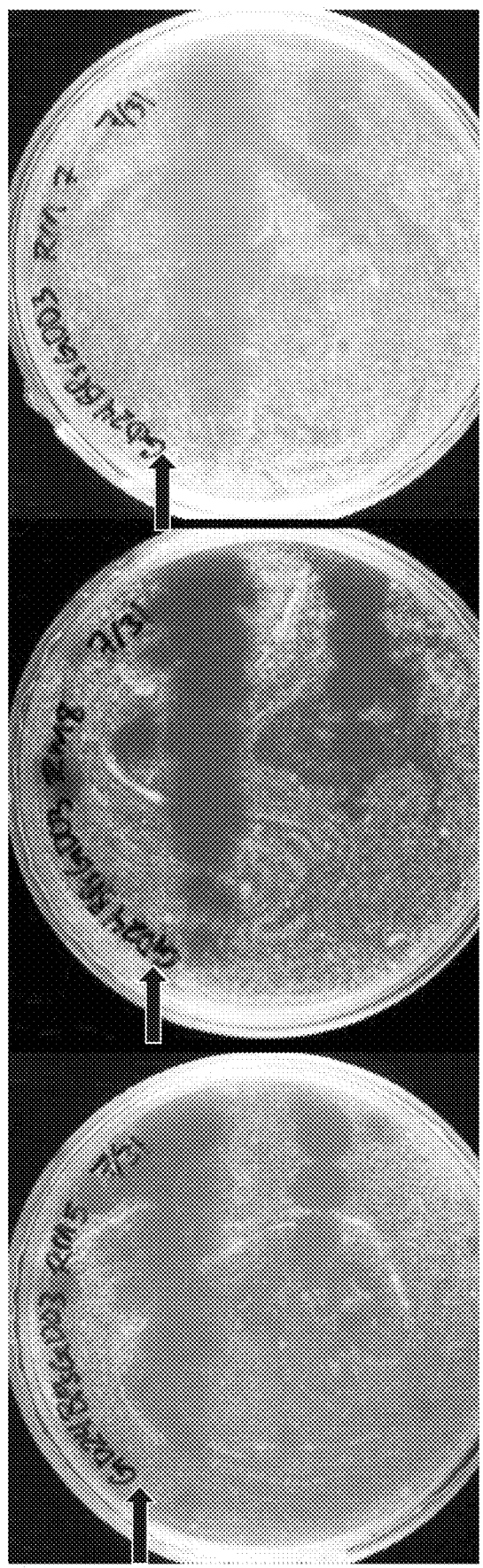
FIG. 5B shows agar plates illustrating results from plaque assays of the three resistance mutants. Growth of colonies (shown by arrows) in the top row of each of the three agar plates illustrates that the three resistance mutants remained sensitive to infection by BPsΔ33HTH_HRMGD03. Only high concentrations of BPsΔ33HTH_HRMGD03 phage were able to infect the bacterial strain illustrated by formation of plaques.

The phage susceptibility profiles shown in Example 5 show that some bacterial strains are only susceptible to one bacteriophage (out of the tested bacteriophages). This example discusses the prospects of treatment using one phage—monotherapy treatment. Several strains of M. abscessus were examined for infection with either Muddy or one of the derivatives of BPs. A culture of M. abscessus GD24 at $7 \times 10^7$ CFU/ml was challenged by addition of $7 \times 10^8$ PFU/ml of phage BPsΔ33HTH_HRM$^{GD03}$ in liquid culture. After incubation for 5 days, aliquots were plated on solid media and incubated. FIG. 5A shows agar plates illustrating phage susceptibility of M. abscessus GD 24 strain. Agar plate on left shows heavy bacterial growth in the absence of a phage whereas agar plate on right shows growth of few colonies due to susceptibility of M. abscessus GD 24 strain to BPsΔ33HTH_HRM$^{GD03}$. FIG. 5B shows agar plates illustrating results from plaque assays of the three resistance mutants. Growth of colonies (shown by arrows) in the top row of each of the three agar plates illustrates that the three resistance mutants remained sensitive to infection by BPsΔ33HTH_HRM$^{GD03}$. Only high concentrations of BPsΔ33HTH_HRM$^{GD03}$ phage were able to infect the bacterial strain illustrated by formation of plaques.

As shown in FIG. 5A, heavy growth was observed in the absence of phage, and only few colonies were recovered in the phage challenge. Four colonies were picked, streaked, grown in liquid culture, and tested for phage resistance. FIG. 5B shows plaque assays showing that the three resistance mutants remained sensitive to infection by BPsΔ33HTH_HRM$^{GD03}$, as seen by infection in the serial dilution of a BPsΔ33HTH_HRM$^{GD03}$ spotted in the top rows (denoted by arrows) of the plates. This example illustrates that survivors from this phage infection arise at only low frequency (<10$^{-7}$) and when the survivors are propagated and re-tested, that they are still sensitive to infection by that phage. Thus, stably resistant mutants were not recovered. Although this may not be observed for all strain-phage combinations, it suggests the feasibility of monotherapy with minimal risk of treatment failure due to resistance. Even if monotherapy it not used, it indicates that no more than two phages in a cocktail will be needed for effective therapy for a strain known to be sensitive to both phages Example 7—Reporter Derivative of Phage FionnbharthΔ45Δ47

Figure 6B:
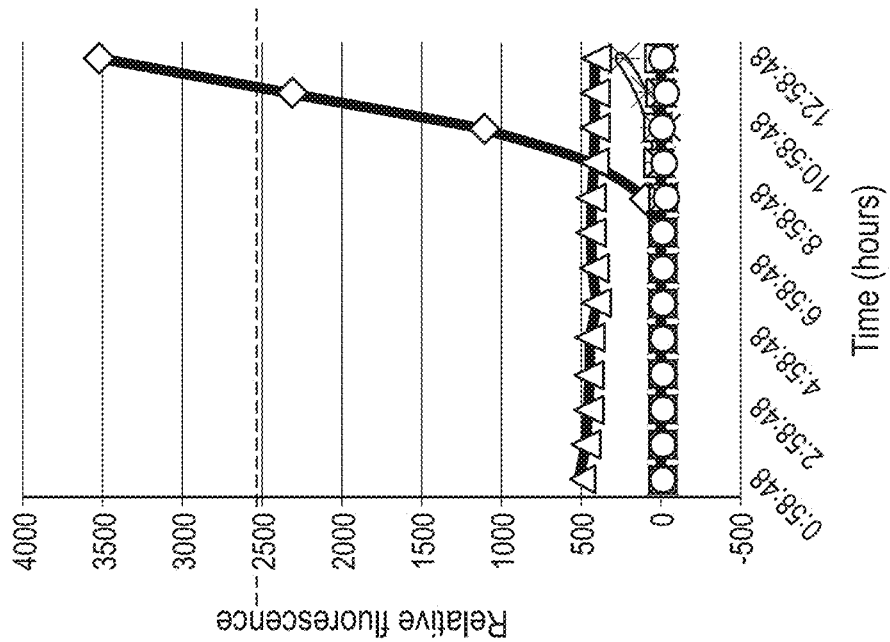
FIG. 6B is a graph showing red fluorescent output following infection of *M. smegmatis* mc2155 with Fionnbharth:mcherry (line with diamonds). Line with diamonds shows output from the Fionnbharth:mCherry reporter phage with *M. smegmatis* strain LM14—a mutant that is resistant to phage Fionnbharth. Other data points show a variety of controls that exhibited low or background levels of fluorescence, including phage buffer (line with squares), *M. smegmatis* strain LM14 with no phage added (line with open circles), *M. smegmatis* mc2155 with no phage added (line with crosses) and Fionnbharth:mCherry lysate without bacteria (line with triangles).
Figure 6A:
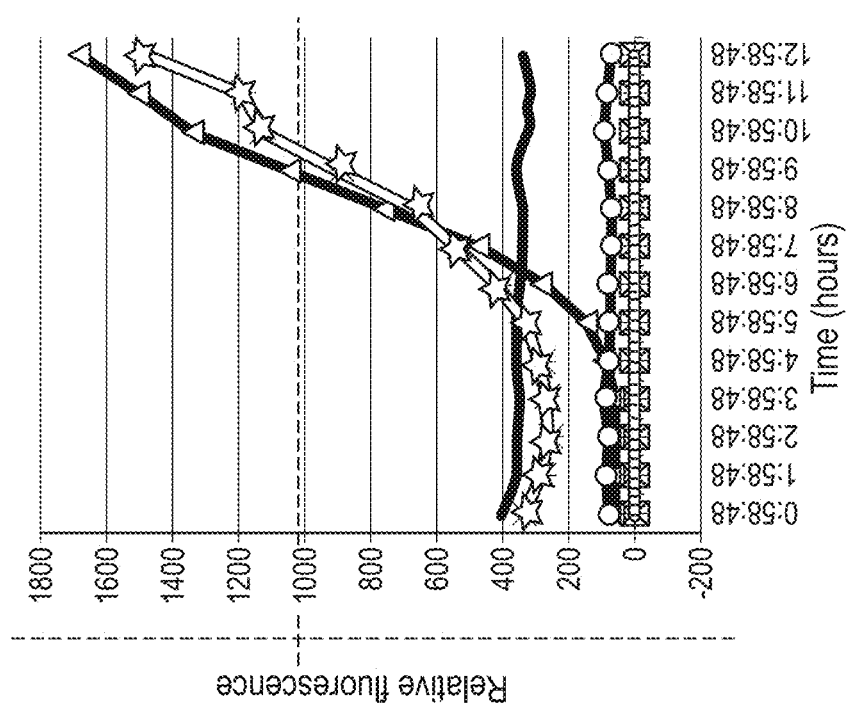
FIG. 6A is a graph showing fluorescent output following infection of *M. smegmatis* with reporter phages. The bolded black line with open triangles shows infection with Fionnbharth-mCherry reporter phage incubated with *M. smegmatis*; the line with stars shows output from a TM4-mCherry reporter phage incubated with *M. smegmatis*. Other data points show a variety of controls that exhibited low or background levels of fluorescence, which include phage buffer (blue), *M. smegmatis* mc2155 with no phage added (line with crosses), *M. smegmatis* mc2155 with TM4:egfp lysate (line with vertical lines within the line), Phage Fionnbharth lysate without bacteria added (line with open circles), TM4:egfp lysate without bacteria added (line with squares), and TM4:mcherry lysate without bacteria added (bolded black line).

This example describes the use of a reporter derivative of phage FionnbharthΔ45Δ47, which carries the mCherry fluorescent gene. Briefly, *M. smegmatis*, mc$^2$155 cells were grown to approximately 5×10$^7$ cells per milliliter in Middlebrook 7H9 broth with ADC enrichment and at 37° C. *M. smegmatis*. In a microtiter plate, 120 μl of cells was added to each well and mixed with 0.1 ml of FionnbharthΔ45Δ47: mcherry particles with a multiplicity of infection of 1. The cell-phage mixture was incubated at 37° C. Fluorescence activity was measured and plotted. FIG. 6A is a graph showing fluorescent output following infection of *M. smegmatis* with reporter phages. The bolded black line with open triangles shows infection with Fionnbharth-mCherry reporter phage incubated with *M. smegmatis*; the line with stars shows output from a TM4-mCherry reporter phage incubated with *M. smegmatis*. Other data points show a variety of controls that exhibited low or background levels of fluorescence, which include phage buffer (blue), *M. smegmatis* mc$^2$155 with no phage added (line with crosses), *M. smegmatis* mc$^2$155 with TM4:egfp lysate (line with vertical lines within the line), Phage Fionnbharth lysate without bacteria added (line with open circles), TM4:egfp lysate without bacteria added (line with squares), and TM4: mcherry lysate without bacteria added (bolded black line). FIG. 6B is a graph showing red fluorescent output following infection of *M. smegmatis* mc$^2$155 with Fionnbharth: mcherry (line with diamonds). Line with diamonds shows output from the Fionnbharth:mCherry reporter phage with *M. smegmatis* strain LM14—a mutant that is resistant to phage Fionnbharth. Other data points show a variety of controls that exhibited low or background levels of fluorescence, including phage buffer (line with squares), *M. smegmatis* strain LM14 with no phage added (line with open circles), *M. smegmatis* mc$^2$155 with no phage added (line with crosses) and Fionnbharth:mCherry lysate without bacteria (line with triangles)

As shown in FIG. 6A, fluorescence output increases overtime up to about 12 hours after infection. The behaviour is similar to TM4 reporter phage (used as control) (see Piuri, M., W. R. Jacobs, Jr. & G. F. Hatfull, (2009) Fluoromycobacteriophages for rapid, specific, and sensitive antibiotic susceptibility testing ofMycobacterium tuberculosis. PLoS ONE 4: e4870). Various negative controls exhibited low or background levels of fluorescence. FIG. 6B shows a mutant bacterial strain (*Mycobacterium smegmatis* LM14) that is resistant to Fionnbharth, and exhibited little or no fluorescence from the Fionnbharth reporter phage. This experiment shows that the reporter phage can readily distinguish between a bacterial strain that is sensitive to a specific phage infection and a bacterial strain that is resistant to a specific phage infection.

Example 8—Rapid High-Throughput Screening for Phage Sensitivity

This example discusses the screening of strains for susceptibility by using a high-throughput screen through the use of reporter phages that carry a fluorescent reporter gene. The high-throughput screen uses reporter derivatives of phages described in Tables 2-5.

Briefly, reporter phage derivates with different color reporter gene are constructed for BPsΔ33HTH-HRM10, Muddy, ZoeJΔ45, Adephagia, Adjutor, Alma, BPs, BPsΔ33, BPsΔ33HTH HRM10, BPs HRM2, BPsΔ33HTH HRMGD03, BPsΔ33HTH HRMGD10, Bxb1, Cain, Charlie, Che9c, D29, Elmo_HRMsmeg, FionnbharthΔ45Δ47, Fred313_cpm1, Isca, Isca_HRMsmeg, Itos, Island3, Jeon, Larva, Muddy_HRMGD04, Nanosmite, Peaches, Pegleg, and ZoeJ using methods described in Jacobs, W. R., et al., (1993) Rapid assessment of drug susceptibilities ofMycobacterium tuberculosis by means of luciferase reporter phages. Science 260: 819-822. Different reporter phages are incubated either one bacterial strain or multiple bacterial strains. Fluorescence is measured using microtiter plate format in a plate reader. Infection of a particular bacterial strain with a specific phage is accompanied by an increase in fluorescence output exhibited by a specific color corresponding to the reporter gene that was encoded in reporter phage derivative.

This example shows the potential to construct reporter phages of all of the those described in Tables 2-5, but with different colored reporter genes. As such, different phages could be multiplexed into a single assay so as to show which phage(s) from a mixture are able to infect any particular strain.

Example 9—Testing Susceptibility of Mycobacteria Using Colony Morphology

This example discusses the use of colony morphology of numerous mycobacterial clinical isolates to test phage susceptibility.

Bacterial Growth and Colony Morphology

In extending and expanding characterization of phage susceptibility patterns in *M. abscessus*, a total of 70 clinical isolates were characterized. Each isolate was grown and tested for phage susceptibility using standard plaque assays with a mycobacteriophage collection. Briefly, *M. abscessus* strains were grown in 10 ml 7H9 media with OADC and 1 mM CaCl$_2$) for about 72 hours at 37° C. shaking. *M. abscessus* strains were also streaked onto 7H10 plates with OADC and incubated at 37° C. for 5 days to visualize colony morphology.

Figure 8:
FIG. 8 shows rough (left) and smooth (right) colony morphologies of *M. abscessus* clinical isolate GD68A and GD68B grown on solid media.
Figure 8:
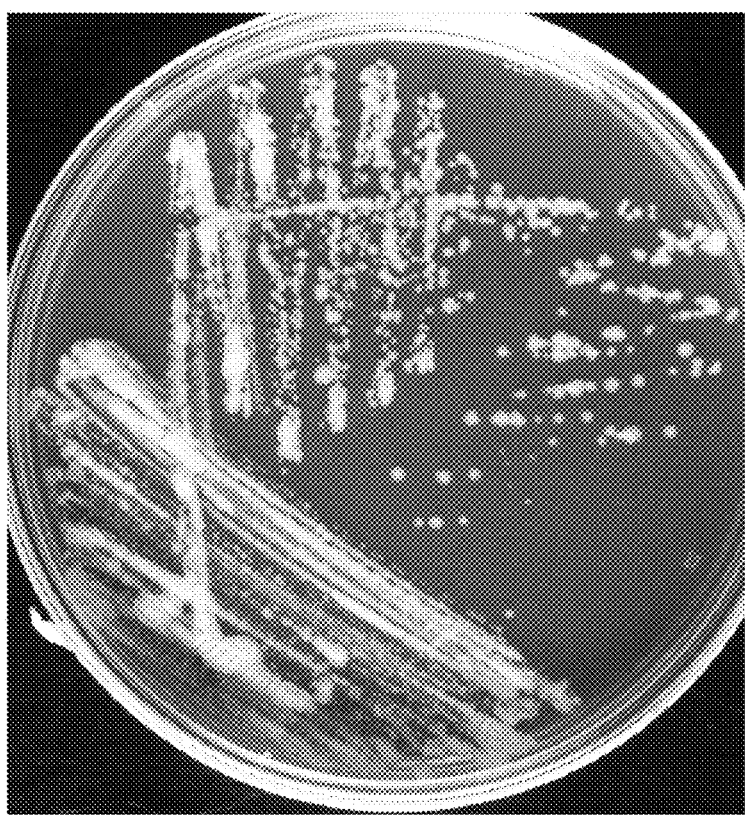

The colony morphotype of each strain was recorded as either smooth or rough appearance. FIG. 8 shows rough (left) and smooth (right) colony morphologies of *M. abscessus* clinical isolate GD68A and GD68B grown on solid media.

Phage Susceptibility Assay

In this example, numerous bacteriophages and engineered derivatives were tested on *M. smegmatis* mc2155 or *M. abscessus* clinical isolates.

Briefly, lysates of each phage were serially diluted in phage buffer (10 mM Tris-HCl pH 7.5, 68.5 mM NaCl, 10 mM $MgSO_4$, 1 mM $CaCl_2$)) and spotted onto top agar overlays of either *M. smegmatis* mc2155 or *M. abscessus* clinical isolates, incubated at 37° C. for 24-48 hours for *M. smegmatis* or 5 days for *M. abscessus*, and analyzed for plaque formation (see Jacobs-Sera, D. et al. (2012), Virology, 434, 187-201). Table 7 provides a record of each strain's antibiotic resistance profile.

TABLE 7

A record of antibiotic resistance profile for each clinical isolate (designated by GDxx). Three subspecies 'type' strains (abscessus, ATCC19977; masilliense GD06; boletti BD) are also listed in the table. Clinical isolates that are resistant to an antibiotic are denoted by "R." Clinical isolates that are sensitive to an antibiotic are denoted by "S." Antibiotic profiles were not tested for clinical isolates denoted by "X." Clinical isolates that have intermediate resistance are denoted by I.

| | Antibiotic Susceptibility | | | | | | | | | | |
|---|---|---|---|---|---|---|---|---|---|---|---|
| Strain | Amikacin | Cefoxitin | Ciprofloxacin | Clarithromycin | Doxycycline | Imipenem | Linezolid | Minocycline | Moxifloxin | Trimethoprim/Sulfa | Tobramycin |
| GD14 | X | X | X | X | X | X | X | X | X | X | X |
| GD21 | X | X | X | X | X | X | X | X | X | X | X |
| GD39 | X | X | X | X | X | X | X | X | X | X | X |
| GD75 | S | S | R | R | R | S | S | R | R | R | I |
| GD11 | X | X | X | X | X | X | X | X | X | X | X |
| GD20 | R | R | R | R | R | S | R | I | R | S | R |
| GD22 | S | S | R | R | R | S | S | R | R | R | I |
| GD57 | R | R | R | R | R | I | S | R | R | R | I |
| GD35 | S | R | R | S | R | R | S | R | R | R | R |
| GD100A | S | S | R | R | R | S | S | R | R | R | I |
| GD100B | S | S | R | I | R | S | S | R | R | R | I |
| GD34 | S | S | R | R | R | S | S | R | R | R | I |
| GD24 | X | X | X | X | X | X | X | X | X | X | X |
| GD08 | X | X | X | X | X | X | X | X | X | X | X |
| GD13 | X | X | X | X | X | X | X | X | X | X | X |
| GD42 | X | X | X | X | X | X | X | X | X | X | X |
| GD43A | X | X | X | X | X | X | X | X | X | X | X |
| GD43B | X | X | X | X | X | X | X | X | X | X | X |
| GD12 | X | X | X | X | X | X | X | X | X | X | X |
| GD84 | S | S | I | I | I | S | R | I | I | I | I |
| GD81 | X | X | X | X | X | X | X | X | X | X | X |
| GD89 | R | S | R | R | R | R | R | I | R | R | R |
| ATCC19977 | X | X | X | X | X | X | X | X | X | X | X |
| GD26 | S | S | R | R | R | R | S | R | R | R | I |
| GD17 | S | R | R | R | I | R | R | R | R | S | I |
| GD23 | X | X | X | X | X | X | X | X | X | X | X |
| GD59 | R | R | R | R | R | R | R | R | R | S | I |
| GD15 | X | X | X | X | X | X | X | X | X | X | X |
| GD41 | S | S | R | R | R | R | S | R | R | R | I |
| GD27 | R | S | R | R | R | S | S | R | R | R | I |
| GD47 | S | S | R | R | S | S | S | S | S | R | R |
| GD40 | X | X | X | X | X | X | X | X | X | X | X |
| GD36 | S | S | S | R | R | S | S | I | S | S | S |
| GD28 | X | X | X | X | X | X | X | X | X | X | X |
| GD05 | X | X | X | X | X | X | X | X | X | X | X |
| GD33 | R | I | I | S | I | S | R | R | R | I | R |
| GD19 | X | X | X | X | X | X | X | X | X | X | X |
| GD88 | X | X | X | X | X | X | X | X | X | X | X |
| GD97 | S | S | R | R | I | I | S | R | R | R | R |
| GD63 | R | S | R | R | R | S | R | R | R | R | R |
| GD56 | S | S | R | R | R | S | R | R | R | R | I |
| GD61 | X | X | X | X | X | X | X | X | X | X | X |
| GD38 | R | R | R | R | R | R | S | R | R | R | R |
| GD55 | S | S | R | R | R | S | R | R | R | R | R |
| GD64 | S | S | R | R | R | I | R | I | R | R | R |
| GD51 | S | S | R | R | R | R | S | S | R | I | I |
| GD87 | X | X | X | X | X | X | X | X | X | X | X |
| GD25 | X | X | X | X | X | X | X | X | X | X | X |
| GD52 | S | R | R | R | R | I | R | I | R | I | R |
| GD09 | X | X | X | X | X | X | X | X | X | X | X |
| GD45 | R | S | R | R | R | S | R | R | R | R | R |
| GD54 | X | X | X | X | X | X | X | X | X | X | X |
| GD102 | X | X | X | X | X | X | X | X | X | X | X |

TABLE 7-continued

A record of antibiotic resistance profile for each clinical isolate (designated by GDxx). Three subspecies 'type' strains (abscessus, ATCC19977; masilliense GD06; boletti BD) are also listed in the table. Clinical isolates that are resistant to an antibiotic are denoted by "R." Clinical isolates that are sensitive to an antibiotic are denoted by "S." Antibiotic profiles were not tested for clinical isolates denoted by "X." Clinical isolates that have intermediate resistance are denoted by I.

| | Antibiotic Susceptibility | | | | | | | | | | |
|---|---|---|---|---|---|---|---|---|---|---|---|
| Strain | Ami-kacin | Cefoxi-tin | Cipro-floxacin | Clarithro-mycin | Doxy-cycline | Imipe-nem | Line-zolid | Mino-cycline | Moxi-floxin | Trimetho-prim/Sulfa | Tobra-mycin |
| GD86 | X | X | X | X | X | X | X | X | X | X | X |
| GD72 | S | S | R | S | R | S | R | I | R | R | R |
| GD18 | X | X | X | X | X | X | X | X | X | X | X |
| GD92 | S | S | R | R | R | S | S | R | R | S | S |
| GD95 | R | S | R | R | R | S | S | I | R | R | I |
| GD62 | X | X | X | X | X | X | X | X | X | X | X |
| GD108 | S | S | S | I | R | R | R | R | R | R | R |
| GD69A | S | S | R | R | R | S | S | R | R | R | R |
| GD69B | S | S | R | R | R | S | S | R | R | R | R |
| GD85 | S | S | R | R | R | R | R | I | R | R | R |
| GD37 | S | S | R | R | R | R | R | I | R | R | R |
| GD91 | S | S | I | R | I | I | S | I | I | I | I |
| GD01 | X | X | X | X | X | X | X | X | X | X | X |
| GD82 | I | S | R | R | R | R | R | R | R | R | R |
| GD58 | S | S | R | S | R | S | R | R | R | R | I |
| GD104 | S | S | R | S | R | R | S | R | R | R | I |
| GD30 | S | S | R | S | R | S | S | R | R | R | I |
| GD10 | S | S | R | S | R | S | S | R | R | R | I |
| GD03 | X | X | X | X | X | X | X | X | X | X | X |
| GD79 | X | X | X | X | X | X | X | X | X | X | X |
| GD60 | S | I | R | S | R | R | S | I | R | S | I |
| GD44 | S | S | R | S | R | S | R | I | R | R | R |
| GD16 | S | S | R | R | R | R | S | R | S | R | I |
| GD02 | X | X | X | X | X | X | X | X | X | X | X |
| GD90 | R | S | R | I | R | R | I | I | I | R | R |
| GD53 | S | R | R | S | R | S | S | I | R | R | R |
| GD68A | S | S | R | R | S | S | S | S | S | 1 | I |
| GD68B | S | S | R | R | R | S | R | R | R | I | I |
| GD04 | X | X | X | X | X | X | X | X | X | X | X |
| GD111 | X | X | X | X | X | X | X | X | X | X | X |

TABLE 8 provides a record of each strain's infection profile against bacteriophages (BPsΔ33HTH_HRM, Muddy, ZoeJΔ45, Itos, Faith1Δ38-40, FionnbharthΔ45Δ47, D29_HRMGD40, Elmo). Rough colony morphology is denoted by "R" and smooth colony morphology is denoted by "S." Phage susceptibility is represented by "1" and clinical isolates that show no infection by a phage or clinical isolates that are efficiently infected but not killed by a phage are denoted by "0." M. abscessus, M. bolletti, and M massiliense are represented by a, b, and m, respectively. As seen in table 8, ~75% of 'rough' strains are susceptible to one or more therapeutically useful phage. In contrast, none of smooth strains are sensitive to any therapeutically useful phages.

| | | | | Phage Susceptibility | | | | | | | |
|---|---|---|---|---|---|---|---|---|---|---|---|
| Strain | Sub-species | Morpho-logy | Nothing | BPsΔ33-HTH_HRM | Muddy | ZoeJΔ45 | Itos | Faith1-Δ38-40 | Fionn-bharthΔ45Δ47 | D29_HRM$^{GD40}$ | Elmo |
| GD14 | a | R | 1 | 0 | 0 | 0 | 0 | 0 | 0 | 0 | 0 |
| GD21 | a | S | 1 | 0 | 0 | 0 | 0 | 0 | 0 | 0 | 0 |
| GD39 | a | S | 1 | 0 | 0 | 0 | 0 | 0 | 0 | 0 | 0 |
| GD75 | a | S | 1 | 0 | 0 | 0 | 0 | 0 | 0 | 0 | 0 |
| GD11 | a | R | 0 | 1 | 0 | 0 | 0 | 0 | 0 | 0 | 0 |
| GD20 | a | R | 0 | 1 | 0 | 0 | 0 | 0 | 0 | 0 | 0 |
| GD22 | a | R | 0 | 1 | 0 | 0 | 0 | 0 | 0 | 0 | 0 |
| GD57 | a | R | 0 | 1 | 0 | 0 | 0 | 0 | 0 | 1 | 0 |
| GD35 | a | R | 0 | 1 | 0 | 0 | 0 | 0 | 0 | 0 | 0 |
| GD100A | a | S | 1 | 0 | 0 | 0 | 0 | 0 | 0 | 0 | 0 |
| GD100B | a | R | 0 | 1 | 0 | 0 | 0 | 0 | 0 | 0 | 0 |
| GD34 | a | S | 1 | 0 | 0 | 0 | 0 | 0 | 0 | 0 | 0 |
| GD24 | a | R | 0 | 1 | 0 | 0 | 0 | 0 | 0 | 0 | 0 |
| GD08 | a | R | 0 | 1 | 0 | 0 | 0 | 0 | 0 | 0 | 0 |
| GD13 | a | R | 1 | 0 | 0 | 0 | 0 | 0 | 0 | 0 | 0 |
| GD42 | a | S | 1 | 0 | 0 | 0 | 0 | 0 | 0 | 0 | 0 |
| GD43A | a | S | 1 | 0 | 0 | 0 | 0 | 0 | 0 | 0 | 0 |

TABLE 8-continued provides a record of each strain's infection profile against bacteriophages
(BPsΔ33HTH_HRM, Muddy, ZoeJΔ45, Itos, Faith1Δ38-40, FionnbharthΔ45Δ47,
D29_HRMGD40, Elmo). Rough colony morphology is denoted by "R" and smooth colony
morphology is denoted by "S." Phage susceptibility is represented by "1" and clinical isolates
that show no infection by a phage or clinical isolates that are efficiently infected but not
killed by a phage are denoted by "0." *M. abscessus*, M. bolletti, and M massiliense are
represented by a, b, and m, respectively. As seen in table 8, ~75% of 'rough' strains are
susceptible to one or more therapeutically useful phage. In contrast, none of smooth strains
are sensitive to any therapeutically useful phages.

| Strain | Sub-species | Morpho-logy | Nothing | BPsΔ33-HTH_HRM | Muddy | ZoeJΔ45 | Itos | Faith1-Δ38-40 | Fionn-bharthΔ45Δ47 | D29_HRM$^{GD40}$ | Elmo |
|---|---|---|---|---|---|---|---|---|---|---|---|
| GD43B | a | R | 0 | 1 | 0 | 0 | 0 | 0 | 0 | 0 | 0 |
| GD12 | a | R | 0 | 1 | 1 | 0 | 0 | 0 | 0 | 0 | 0 |
| GD84 | a | S | 1 | 0 | 0 | 0 | 0 | 0 | 0 | 0 | 0 |
| GD81 | a | S | 1 | 0 | 0 | 0 | 0 | 0 | 0 | 0 | 0 |
| GD89 | a | R | 0 | 1 | 0 | 0 | 0 | 0 | 0 | 1 | 0 |
| ATCC19977 | a | S | 1 | 0 | 0 | 0 | 0 | 0 | 0 | 0 | 0 |
| GD26 | a | R | 0 | 1 | 0 | 0 | 0 | 0 | 0 | 0 | 0 |
| GD17 | a | R | 0 | 1 | 0 | 0 | 0 | 0 | 0 | 0 | 0 |
| GD23 | a | R | 1 | 0 | 0 | 0 | 0 | 0 | 0 | 0 | 0 |
| GD59 | a | R | 0 | 1 | 0 | 0 | 0 | 0 | 0 | 0 | 0 |
| GD15 | a | R | 0 | 1 | 0 | 0 | 0 | 0 | 0 | 0 | 0 |
| GD41 | a | R | 0 | 1 | 0 | 0 | 0 | 0 | 0 | 1 | 0 |
| GD27 | a | R | 0 | 1 | 0 | 0 | 0 | 0 | 0 | 0 | 0 |
| GD47 | a | S | 1 | 0 | 0 | 0 | 0 | 0 | 0 | 0 | 0 |
| GD40 | a | R | 0 | 1 | 0 | 0 | 0 | 0 | 0 | 1 | 0 |
| GD36 | a | S | 1 | 0 | 0 | 0 | 0 | 0 | 0 | 0 | 0 |
| GD28 | a | S | 1 | 0 | 0 | 0 | 0 | 0 | 0 | 0 | 0 |
| GD05 | a | R | 1 | 0 | 0 | 0 | 0 | 0 | 0 | 0 | 0 |
| GD33 | a | S | 1 | 0 | 0 | 0 | 0 | 0 | 0 | 0 | 0 |
| GD19 | a | R | 0 | 0 | 1 | 0 | 0 | 0 | 0 | 0 | 0 |
| GD88 | a | R | 1 | 0 | 0 | 0 | 0 | 0 | 0 | 0 | 0 |
| GD97 | a | S | 1 | 0 | 0 | 0 | 0 | 0 | 0 | 0 | 0 |
| GD63 | a | S | 1 | 0 | 0 | 0 | 0 | 0 | 0 | 0 | 0 |
| GD56 | a | R | 1 | 0 | 0 | 0 | 0 | 0 | 0 | 0 | 0 |
| GD61 | a | S | 1 | 0 | 0 | 0 | 0 | 0 | 0 | 0 | 0 |
| GD38 | a | R | 0 | 1 | 0 | 0 | 0 | 0 | 1 | 0 | 0 |
| GD55 | a | S | 1 | 0 | 0 | 0 | 0 | 0 | 0 | 0 | 0 |
| GD64 | a | S | 1 | 0 | 0 | 0 | 0 | 0 | 0 | 0 | 0 |
| GD51 | a | R | 0 | 0 | 1 | 0 | 0 | 0 | 0 | 0 | 0 |
| GD87 | a | R | 1 | 0 | 0 | 0 | 0 | 0 | 0 | 0 | 0 |
| GD25 | a | R | 0 | 0 | 1 | 0 | 0 | 0 | 0 | 0 | 0 |
| GD52 | a | R | 0 | 1 | 0 | 0 | 0 | 0 | 1 | 0 | 0 |
| GD09 | a | S | 1 | 0 | 0 | 0 | 0 | 0 | 0 | 0 | 0 |
| GD45 | a | R | 0 | 0 | 1 | 0 | 0 | 0 | 0 | 0 | 0 |
| GD54 | a | R | 0 | 1 | 1 | 0 | 0 | 0 | 0 | 0 | 0 |
| GD102 | a | R | 0 | 0 | 1 | 0 | 0 | 0 | 0 | 0 | 0 |
| GD86 | a | R | 0 | 0 | 1 | 0 | 0 | 0 | 0 | 0 | 0 |
| GD72 | a | S | 1 | 0 | 0 | 0 | 0 | 0 | 0 | 0 | 0 |
| GD18 | a | S | 1 | 0 | 0 | 0 | 0 | 0 | 0 | 0 | 0 |
| GD92 | a | R | 0 | 0 | 1 | 0 | 0 | 0 | 0 | 0 | 0 |
| GD95 | a | R | 0 | 0 | 0 | 0 | 0 | 0 | 0 | 0 | 0 |
| GD62 | a | R | 0 | 0 | 0 | 0 | 0 | 0 | 0 | 0 | 0 |
| GD108 | a | S | 1 | 0 | 0 | 0 | 0 | 0 | 0 | 0 | 0 |
| GD69A | a | R | 0 | 0 | 0 | 0 | 0 | 0 | 0 | 0 | 0 |
| GD69B | a | S | 1 | 0 | 0 | 0 | 0 | 0 | 0 | 0 | 0 |
| GD85 | a | S | 1 | 0 | 0 | 0 | 0 | 0 | 0 | 0 | 0 |
| GD37 | b | S | 1 | 0 | 0 | 0 | 0 | 0 | 0 | 0 | 0 |
| GD91 | b | S | 1 | 0 | 0 | 0 | 0 | 0 | 0 | 0 | 0 |
| GD01 | m | R | 0 | 1 | 1 | 1 | 0 | 0 | 0 | 0 | 0 |
| GD82 | m | R | 0 | 1 | 1 | 1 | 0 | 0 | 0 | 0 | 0 |
| GD58 | m | S | 0 | 0 | 1 | 0 | 0 | 0 | 0 | 0 | 0 |
| GD104 | m | R | 0 | 1 | 0 | 0 | 0 | 0 | 0 | 0 | 0 |
| GD30 | m | R | 0 | 0 | 1 | 0 | 0 | 0 | 0 | 0 | 0 |
| GD10 | m | R | 0 | 0 | 1 | 0 | 0 | 0 | 0 | 0 | 0 |
| GD03 | m | S | 1 | 0 | 0 | 0 | 0 | 0 | 0 | 0 | 0 |
| GD79 | m | R | 0 | 1 | 1 | 1 | 0 | 0 | 0 | 0 | 0 |
| GD60 | m | R | 1 | 0 | 0 | 0 | 0 | 0 | 0 | 0 | 0 |
| GD44 | m | S | 1 | 0 | 0 | 0 | 0 | 0 | 0 | 0 | 0 |
| GD16 | m | S | 1 | 0 | 0 | 0 | 0 | 0 | 0 | 0 | 0 |
| GD02 | m | R | 0 | 0 | 0 | 0 | 0 | 0 | 0 | 0 | 1 |
| GD90 | m | S | 1 | 0 | 0 | 0 | 0 | 0 | 0 | 0 | 0 |
| GD53 | m | S | 1 | 0 | 0 | 0 | 0 | 0 | 0 | 0 | 0 |
| GD68A | m | R | 0 | 0 | 1 | 0 | 0 | 0 | 0 | 0 | 0 |

TABLE 8-continued provides a record of each strain's infection profile against bacteriophages (BPsΔ33HTH_HRM, Muddy, ZoeJΔ45, Itos, Faith1Δ38-40, FionnbharthΔ45Δ47, D29_HRMGD40, Elmo). Rough colony morphology is denoted by "R" and smooth colony morphology is denoted by "S." Phage susceptibility is represented by "1" and clinical isolates that show no infection by a phage or clinical isolates that are efficiently infected but not killed by a phage are denoted by "0." *M. abscessus*, M. bolletti, and M massiliense are represented by a, b, and m, respectively. As seen in table 8, ~75% of 'rough' strains are susceptible to one or more therapeutically useful phage. In contrast, none of smooth strains are sensitive to any therapeutically useful phages.

| Strain | Sub-species | Morpho-logy | Phage Susceptibility | | | | | | | | |
|---|---|---|---|---|---|---|---|---|---|---|---|
| | | | Nothing | BPsΔ33-HTH_HRM | Muddy | ZoeJΔ45 | Itos | Faith1-Δ38-40 | Fionn-bharthΔ45Δ47 | D29_HRM$^{GD40}$ | Elmo |
| GD68B | m | S | 1 | 0 | 0 | 0 | 0 | 0 | 0 | 0 | 0 |
| GD04 | m | S | 1 | 0 | 0 | 0 | 0 | 0 | 0 | 0 | 0 |
| GD111 | m | R | 0 | 0 | 1 | 0 | 0 | 0 | 0 | 0 | 0 |

INCORPORATION BY REFERENCE

The entire disclosure of each of the patent and scientific documents referred to herein is incorporated by reference for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein.

What is claimed is:

1. A composition comprising:
   bacteriophages BPsΔ33HTH-HRM10, Muddy, ZoeJΔ45; and
   one or more bacteriophages selected from Adephagia, Adjutor, Alma, BPs, BPsΔ33, BPsΔ33HTH_HRM10, BPs_HRM2, BPsΔ33HTH_HRM$^{GD03}$ BPsΔ33HTH HRM$^{GD10}$ Bxb1, Cain, Charlie, Che9c, D29, Elmo_HRM$^{smeg}$, FionnbharthΔ45Δ47, Fred313_cpm1, Isca, Isca_HRM$^{smeg}$ Itos, Island3, Jeon, Larva, Muddy_HRM$^{GD04}$, Nanosmite, Peaches, Pegleg, ZoeJ, and Faith1Δ38-40.

* * * * *